(12) United States Patent
Dow

(10) Patent No.: US 8,468,027 B2
(45) Date of Patent: Jun. 18, 2013

(54) SYSTEMS AND METHODS FOR DEPLOYING AND UTILIZING A NETWORK OF CONVERSATION CONTROL SYSTEMS

(75) Inventor: Brady Dow, Riverton, UT (US)

(73) Assignee: Kombea Corporation, American Fort, UT (US)

( * ) Notice: Subject to any disclaimer, the term of this patent is extended or adjusted under 35 U.S.C. 154(b) by 2918 days.

(21) Appl. No.: 10/091,651

(22) Filed: Mar. 5, 2002

(65) Prior Publication Data

US 2003/0046101 A1 Mar. 6, 2003

Related U.S. Application Data

(60) Provisional application No. 60/317,199, filed on Sep. 4, 2001.

(51) Int. Cl.
*G06Q 10/00* (2006.01)

(52) U.S. Cl.
USPC .......................................... 705/1.1; 370/260

(58) Field of Classification Search
USPC ..... 370/260–271; 379/88; 235/492; 704/270, 704/234
See application file for complete search history.

(56) References Cited

U.S. PATENT DOCUMENTS

| | | | |
|---|---|---|---|
| 4,623,761 A | 11/1986 | Winter et al. | |
| 4,697,282 A | 9/1987 | Winter et al. | |
| 6,356,634 B1 | 3/2002 | Noble, Jr. | |
| 6,480,599 B1 | 11/2002 | Alnslie et al. | |
| 6,499,017 B1 | 12/2002 | Feibelman | |
| 6,560,328 B1 | 5/2003 | Bondarenko | |
| 6,570,967 B2 | 5/2003 | Katz | |
| 6,607,136 B1 * | 8/2003 | Atsmon et al. | 235/492 |
| 6,722,989 B1 * | 4/2004 | Hayashi | 463/43 |
| 6,731,609 B1 * | 5/2004 | Hirni et al. | 370/260 |
| 6,748,055 B1 * | 6/2004 | Borman et al. | 379/88.14 |
| 2003/0046102 A1 | 3/2003 | Dow | |

FOREIGN PATENT DOCUMENTS

| | | |
|---|---|---|
| CA | 1237838 | 4/1985 |
| DE | 3590157 C2 | 11/1985 |
| EP | 0185029 B1 | 11/1985 |
| GB | 2178625 A | 11/1985 |

OTHER PUBLICATIONS

Golden Voice Technology & Training, L.L.C., *Call Handler Technologies*, internet printout of website at http://www.goldvoice.com., Apr. 24. 2002. 51 pages.
U.S. Appl. No. 10/091,661, filed Mar. 5, 2002, Dow.
File History of U.S. Appl. No. 10/091,661; available from www.uspto.gov; originally filed Mar. 5, 2002 and continuing through Mar. 22, 2007, pp. 1-199.
File History of U.S. Appl. No. 10/091,652; available from www.uspto.gov; originally filed Mar. 5, 2002 and continuing through Jun. 18, 2007, pp. 1-367.

* cited by examiner

*Primary Examiner* — Behrang Badii
(74) *Attorney, Agent, or Firm* — Hamilton DeSanctis & Cha

(57) ABSTRACT

Systems and methods for interacting with recipients. The systems can be computer controlled and provide audio and/or textual output to a recipient. In some cases, the audio output is created by accessing an audio file on the system, converting the audio output to an audio signal, and providing the audio output to the recipient. In various cases, a user selects the appropriate output from a subset of possible outputs provided via the system. The methods include various ways for directing a pseudo-conversation with a recipient via a conversation control system.

23 Claims, 16 Drawing Sheets

SYSTEMS AND METHODS FOR DEPLOYING AND UTILIZING A NETWORK OF CONVERSATION CONTROL SYSTEMS

CROSS-REFERENCES TO RELATED APPLICATIONS

This application claims the benefit of U.S. Provisional Application No. 60/317,199 filed on Sep. 4, 2001.

Further, this application is related to U.S. patent application Ser. No. 10/091,661, entitled "Systems and Methods for Deploying and Utilizing a Network of Conversation Control Systems", and U.S. patent application Ser. No. 10/091,652, entitled "Systems and Methods for Using a Conversation Control System in Relation to a Plurality of Entities", both of which are filed on a date even wherewith.

BACKGROUND OF THE INVENTION

To effectively operate a business involving sales and/or promotion of products and/or services, the business must provide a sales approach that is consistent across a multitude of sales personnel. However, sales personnel or agents are not able to consistently deliver an approach that is consistent with company guidelines for a variety of reasons. This is a particular problem where the sales involve telephone contact between the sales person and a potential customer.

One proposed solution is to carefully script the conversation between sales personnel and potential customers. Through such scripting of the interaction, it is possible to obtain a higher level of consistency in approach, however, a great deal of inconsistency remains due to various factors including, but not limited to, rejection and/or discouragement felt by the sales personnel resulting from rejections during prior calls, personal sickness and/or fatigue experienced by the sales personnel, personality flaws of the sales personnel, boredom, lack of training, improper training and/or inability of the sales personnel to properly communicate or follow instructions, and poor speaking and/or listening skills.

Even if these problems could be cured, other problems related to contacting potential customers by telephone exist. For example, human operators are not well suited to the type of repetition required by contacting customers by telephone in an environment that requires careful and strict adherence to pre-set procedures and scripts. This repetition leads to decreased sales as personnel capable of working in the repetitive market make sales, while others fail to make sales. This is borne out by experience indicating that twenty percent of the sales force are responsible for eighty percent of actual sales. While the remaining eighty-percent of the sales force fails in comparison to the aforementioned twenty percent. This failure often results in high turnover of sales personnel with the majority of personnel not remaining even through a probationary training period.

This employee turnover results in significant employer costs in terms of wasted training resources that cannot be recouped through increased sales. It is not uncommon for an employer to experience an employee turnover of two hundred to three hundred percent and even more. This requires significant expenditures to recruit and train replacement personnel. Furthermore, employees are typically paid to attend training sessions regarding the proper delivery of promotional materials. All of this training is wasted if the employee later tires of and terminates their employment. Furthermore, employee job dissatisfaction leads to a significant increase in absenteeism and corresponding costs to employers including, but not limited to, paid sick days.

Some solutions have been advanced to overcome problems endemic with sales personnel. For example, some companies have tried to identify personnel that are more suited for the type of work by screening the personnel before they are ever hired or any training expense is invested in the employees. Additionally, benefits above just standard compensation are provided for employees that remain on the job for a predetermined period of time or for offering consistent service. Such incentives can include performance incentives, spiffs or bonuses given for sales or even for a properly executed sales approach.

Some solutions involve additional training included regularly and methodically during the course of employment. This training can include: role playing, approach memorization, and/or mirrors placed at a station used by telephone sales personnel to allow employees making sales using a telephone to see facial expressions. Other approaches include the retention of motivational consultants to help instill confidence or enthusiasm in the sales force. Finally, employers typically monitor the approach given by various sales personnel to facilitate training tailored to specific personnel.

Some solutions involve providing the entire sales approach to the employees in a binder. Alternatively, the sales approach can be provided to the employee as a text document reviewable by computer. While these solutions offer some aid to the employee, they still require the employee to repetitive read and execute the sales approach. This process is prone to errors and often not sufficiently flexible to allow a proper approach.

While each of these solutions alleviates some of the problems associated with assuring consistent, cost effective marketing approach, none of the solutions provides an adequate remedy.

BRIEF SUMMARY OF THE INVENTION

The present invention includes various systems and methods for interacting with a recipient. In some embodiments, the interaction is accomplished via telephone, while in other embodiments, the interaction is accomplished via a text interface, or some other method.

In one particular embodiment, a system is provided for contacting a recipient, receiving information from the recipient, providing the information to a user, receiving selections from the user via an interface to the system and, based on the selections, accessing script items in a selected presentation format, and presenting the script items to the recipient. Thus, an interaction with a recipient can be accomplished with output from the system under direction of the user.

One embodiment provides a method for interacting with one or more recipients. The method includes: providing a conversation control system; selecting an approach, a script, and a presentation via the conversation system; and communicating with a recipient. Such communication includes the presentation being provided to the recipient in the order dictated by the script. The presentation is provided to the recipient from the conversation control system. In some embodiments, the script is a sales script, while in other embodiments, the script is a customer service script. In various embodiments, the presentation is a language in which to present the script, while in other embodiments, the presentation is a graphics format.

Another embodiment of the present invention is a pseudo-conversation system for use between one or more users and one or more recipients. The system includes a computer with a computer interface operable to receive input from a user. In addition, the system includes a communication device that accepts input from the computer and provides an audio output accessible to the user. Further, the system comprises a computer readable medium accessible by the computer that includes instructions executable by the computer to: receive a selection from the user, based on the selection from the user, access an audio output, and present the audio output to the communication device.

Yet another embodiment of the present invention is a method for providing a consistent presentation to one or more recipients. The method includes initiating communication with the recipient. Further, the method includes presenting a group of script items to a user and receiving a selection of a script item from the group of script items. The selected script item is then presented to the recipient as an audio output.

Yet another embodiment is a method for responding to inquiries. The method includes receiving an inquiry from a recipient. A group of script items is viewed, and based on the inquiry, a script item is selected from the group of script items. The selected script item is presented to the recipient as an audio output.

The summary provides only a general outline of the embodiments according to the present invention. Many other objects, features and advantages of the present invention will become more fully apparent from the following detailed description, the appended claims and the accompanying drawings.

BRIEF DESCRIPTION OF THE DRAWINGS

A further understanding of the nature and advantages of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

Overview

Figure 1A:
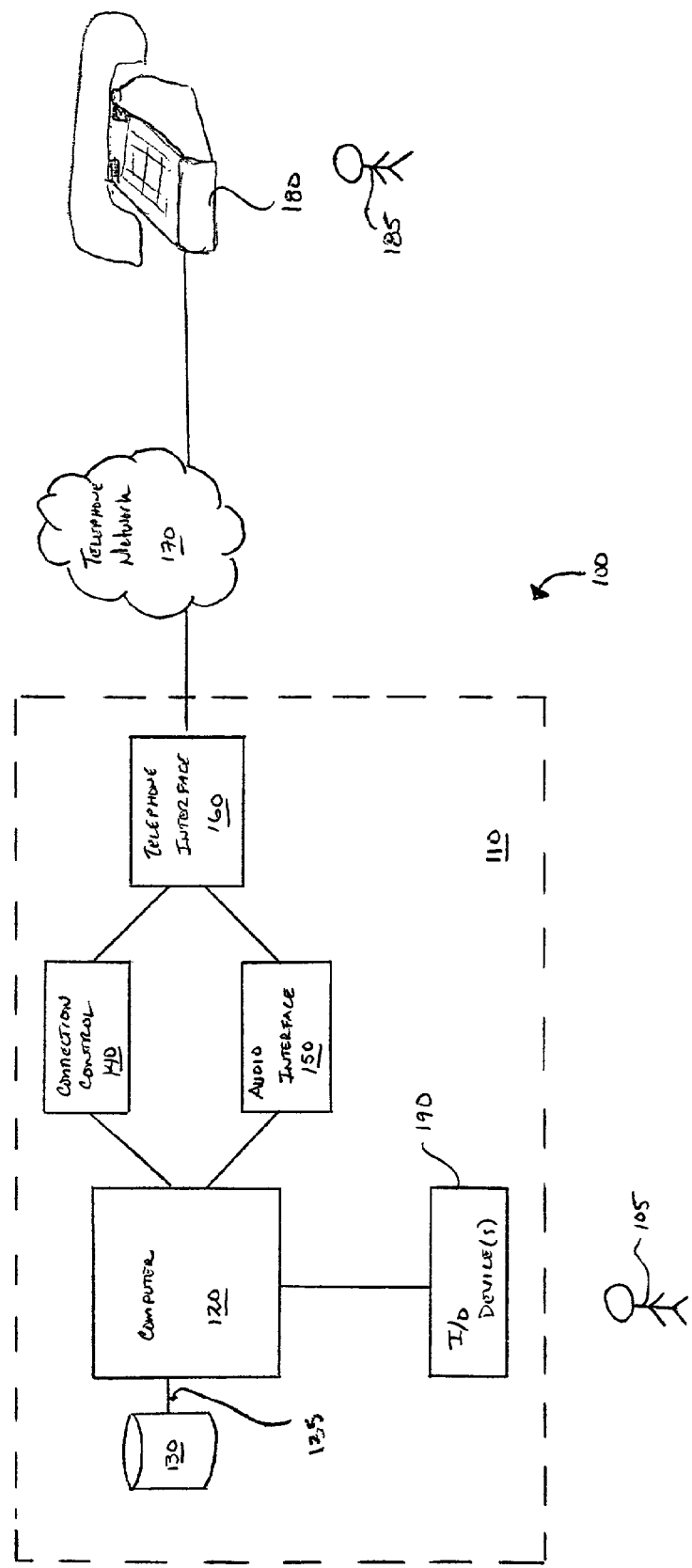
FIG. 1A illustrates an embodiment of a presentation system in accordance with the present invention.

The present invention provides systems and methods for providing approaches via a computer operated by users in relation to recipients. The approaches can be comprised of one or more scripts and presentable in one or more presentation formats. The users can be employees of a call center providing customer service, a help desk for a particular company, a receptionist of a particular company, a professional answering questions via a telephone, a telemarketing sales representative, or any other entity or person desiring to provide a consistent approach to a given topic. Recipients can be potential customers, product purchasers seeking help in properly using a product, a mother of a sick child calling to ask medical advice on an "ask a nurse" line, a person calling a company to request any of a variety of information, a person contacted to perform a telephone survey, a person being trained in a particular topic, or any other person receiving information via systems and methods according to the present invention.

In a particular embodiment, the users are technical representatives providing information about the proper use of one or more products to recipients who are recent purchasers of the products. In another embodiment, the users are sales personnel included within a group of personnel that must sell products and/or services using a consistent approved approach, script and/or presentation to pre-determined recipients. In one particular embodiment, the sales personnel are telemarketing sales personnel.

In other embodiments, both the users and the recipients are sales representatives for a particular entity. In such situations, the systems and methods of the present invention can be used to train the sales personnel in operating the systems and in providing a consistent, valuable approach. Such operation can also enable feedback from sales representatives acting as recipients. The feedback can then be used to update the systems and methods to provide more effective approaches, scripts, and/or presentations in accordance with various embodiments of the present invention.

An approach according to the present invention can include a description of the appropriate method for introducing, teaching, and/or selling. Such approaches can be in written form or alternatively provided in graphical form, such as, for example, through graphical flow charts. As an example, an approach can be a campaign for selling a particular brand of newspapers in a given city. As another example, an approach can be a method for responding to technical questions associated with a particular product. As yet another example, an approach can be a method for responding to medical questions from a particular segment of the population. Based on the disclosure in this document, one will recognize a myriad of other approaches that can be implemented using systems and methods in accordance with the present invention.

Approaches can comprise one or more scripts. Such scripts include a series of steps for implementing the associated approach. Thus, for example, a script may include a salutation, or script item, ending in a question as a first step. In a second step, the script can include a group of script items chosen in anticipation of a recipient's response to the salutation. Thus, for example, where the salutation ends with the question: "What color is George Washington's white horse?"—the group of script items can include: "Correct" and "You are not very bright". Such a script can continue to provide script items at each step to anticipate the various branches that a conversation related to an approach may take.

As previously discussed, approaches may comprise one or more scripts. Each of the different scripts may serve a different purpose leading to a common goal. For example, an approach may comprise two scripts, where the first script implements an aggressive sales approach and the second script implements more of a soft sell. Thus, a user can select a script that will lead to the result desired by the approach depending upon any number of factors. It should be appreciated that any number of scripts are possible in accordance with the present invention. In some embodiments, different scripts are tailored for particular demographic segments. When a particular demographic of recipients are approached, the script tailored for that demographic can be selected. Thus, any user can present an approach, without significant concern about the user's sensitivity to the demographic being approached.

Such scripts include an assemblage of script items. Script items are message segments that are to be presented to a recipient. A set of script items can be maintained in a given format on some sort of storage accessible to a computer. Given formats can be any number of formats. In some embodiments, script items are one or more audio files that can be selected and presented to a recipient as a voice. In other embodiments, script items are maintained as one or more textual files. Such textual files can be selected and presented to a recipient as a text message, or converted and presented to the recipient as a voice. It will be appreciated from the preceding discussion that a great variety of script items and formats thereof are possible in accordance with the present invention.

Script items can be associated with one or more presentations. Such presentations can include, but are not limited to, a given voice, language, and/or accent in the case of an audio presentation of a script item. Alternatively, where the script items are to be presented in textual form, the presentations can include, but are not limited to, different languages and/or graphical presentations to be provided in association with any textual items. In some embodiments, presentations include pre-recorded audio files including information of the associated script item. In other embodiments, presentations include computer generated audio files corresponding to the associated script item. In other embodiments, the presentation can be graphical presentations providing a recipient with a graphical depiction of American Sign Language.

In some embodiments of the present invention, a large number of presentations are maintained on a computer readable medium. A set of these presentations are used in relation to an approach for performing a particular script. At each step of the script, a subset of the presentations are provided for selection by a user as potential replies to a recipient.

Some embodiments of the present invention include a computer-based aid with a database of executable approaches and associated scripts, script items, and presentations. One such embodiment includes a Microsoft™ Access database loaded with approach information. In one embodiment of a method for utilizing the computer-based aid, a recipient is contacted and greeted by a message presented in audio form by the computer-based aid. In turn, the recipient responds to the greeting with the response being routed to a user in an audio form. The user then selects an appropriate script item and the computer-based aid presents the script item to the recipient in an audio form. Thus, a user completes a life-like conversation with a recipient without actually uttering a word. This and other uses of systems in accordance with the present invention are more fully disclosed below.

Exemplary Systems

FIG. 1A illustrates an embodiment of a presentation system 100 in accordance with the present invention. Presentation system 100 includes a conversation control system 110 in communication with a recipient telephone 180 via a telephone network 170. A user 105 operates conversation control system 110 and a recipient 185 uses recipient telephone 180.

Telephone network 170 can be any communication network capable of communicably coupling conversation control system 110 to telephone 180. In some embodiments, telephone network 170 is a Plain Old Telephone System (POTS) network, while in other embodiments, telephone network 170 is a cellular telephone network. Upon reading this document, one of ordinary skill in the art will recognize other networks can be used to provide the functionality of telephone network 170. For example, one will recognize that telephone network 170 can be a computer network capable of carrying digital and/or analog audio signals. Further, one will recognize that telephone 180 can be any type of device capable of receiving and presenting audio, data, and/or textual information to/from recipient 185. For example, telephone 180 can be a cellular telephone, a cellular telephone with textual and/or graphical communication capabilities, a Plain Old Telephone (POT), a POT with enhanced capabilities to receive textual and/or graphical messages, a Personal Digital Assistant (PDA), a PDA with audio output capabilities, a Personal Computer (PC) with display capabilities, a PC with audio output capabilities, or any other such device.

Conversation control system 110 includes a computer 120, a computer readable medium 130, one or more Input/Output (I/O) devices 190, a connection control device 140, an audio interface 150, and a telephone interface 160. Computer 120 can be any microprocessor-based device. In particular embodiments, computer 120 is a PC including an operating system and one or more software applications. In other embodiments, computer 120 is a PDA, a laptop computer, a microprocessor based device designed specifically for providing conversation control, an intelligent cellular telephone, a webserver, or the like.

Computer readable medium 130 can be any medium accessible to computer 120. In one particular embodiment, computer readable medium 130 is a hard disk drive integral with computer 120. In other embodiments, computer readable medium 130 is a combination of mediums including a Random Access Memory (RAM), a hard disk drive, and a portable medium such as a floppy disk and/or a CD-ROM. In yet other embodiments, computer readable medium 130 is a network drive located remote from computer 120. In such cases, a connection 135 between computer 120 and computer readable medium 130 can be a computer network. In some embodiments, computer readable medium 130 includes a webserver. In yet other embodiments, computer readable medium 130 is a combination of both network drives and local storage. Thus, for example, computer readable medium 130 can be a combination of a network drive accessible by a computer network 135, a combination of a hard disk drive and RAM integral to computer 120. It will be appreciated that other types of storage as well as other combinations of storage are possible in accordance with the present invention.

Figure 1B:
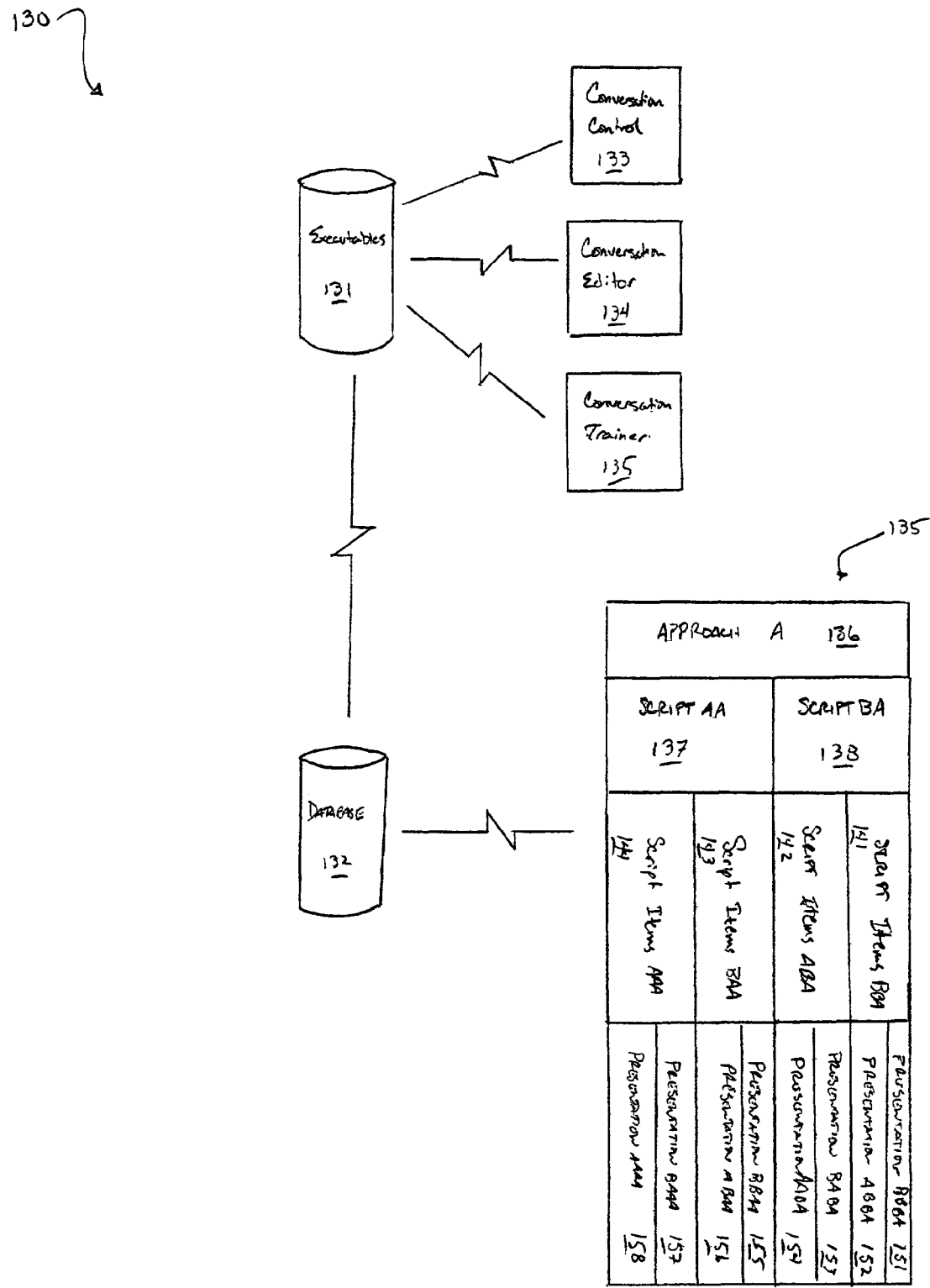
FIG. 1B is a logical diagram illustrating elements incorporated with one embodiment of a conversation control system as illustrated in FIG. 1A.

FIG. 1B illustrates a logical block diagram of one embodiment of computer readable medium 130. In the embodiment, computer readable medium 130 includes a group of executable software applications 131 and a database 132. Database 132 includes one or more data structures 135 maintaining the various components related to providing pseudo-conversation in accordance with the present invention. The components include an approach A 136, and script AA 137 and a script BA 138 associated with approach A 136. Each of script A 136 and script AB 137 are associated with one or more script items 143, 144 and 141, 142, respectively. Each of script items 141, 142, 143, 144 are associated with one or more presentations 151, 152; 153, 154; 155, 156; and 157, 158, respectively. It should be appreciated that various of script items 141, 142, 143, 144 can be common between both script 137 and script 138. Thus, for example, script items BBA 141 may be identical to script items BAA 143. Similarly, various of presentations 151, 152, 153, 154, 155, 156, 157, 158 can be associated with one or more of script items 141, 142, 143, 144.

It should be recognized that database 132 can include any number of data structures 135. Further, it should be recognized that the illustration of data structure 135 is merely illustrative. Many other embodiments of data structure 135 are possible in accordance with the present invention. For example, other embodiments may include only a single script and only a single presentation is offered for the various script items whereby the script items and the presentations can be one in the same. Based on the disclosure provided herein, one of ordinary skill in the art will recognized many other embodiments of data structure 135 that are in accordance with the scope of the present invention.

In one particular embodiment, data structure 135 includes the following tables:

Table 1 name: SCRIPTS—This table holds the general information about the script and presentations associated therewith
Fields: SCRIPT_ID, SCRIPT_NAME, EDIT_PASSWORD, STARTING_SCRIPT_ITEM_ID Table 2 name: SCRIPT_ITEMS—This table holds all information about each "Screen" and what will be displayed to the presenter.
Fields: SCRIPT_ITEM_ID, SCRIPT_ID, ITEM_TYPE, ITEM_CATEGORY, SEQUENCE_LIMIT, ITEM_NAME, ITEM_DESCRIPTION Table 3 name: SCRIPT_ITEM_NAVIGATION—Holds presentation information about what will happen when a user presses a particular key on the keyboard.
Fields: SCRIPT_ITEM_ID, SCRIPT_ID, ITEM_KEY, ITEM_DESCRIPTION, CHILD_SCRIPT_ITEM_ID Table 4 name: CAMPAIGN_SCRIPTS—Holds the scripts status for a given campaign and the voices available for that script and campaign.
Fields: CAMPAIGN, SCRIPT_ID, SCRIPT_STATUS, SCRIPT_PASSWORD, VOICE_ID Table 5 name: VOICES—Table containing the Names of the persons who have done recordings for the presentation(s)
Fields: VOICE_ID, FIRST_NAME, LAST_NAME Table 6 name: SCRIPT_STATUSES—Holds the different statuses and descriptions of a script status.
Field name: ITEM_TYPES—Holds the different Type of items and their description.

Table 7 name: ITEM_CATEGORIES—Holds the different available categories and their description
Field names: ITEM_CATEGORY, DESCRIPTION Table 8 name: GROUPS—Holds the names and descriptions of the grouping of keys used on the keyboard to operate a defined function.
Field: GROUP, DESCRIPTION Table 9 name: CAMPAIGNS—Listing of Campaigns and their description
Fields: CAMPAIGN, DESCRIPTION Executable software applications 131 include a conversation control application 133, a conversation editor application 134, and a conversation trainer application 135. The various applications can be written in any number of computer and/or database languages. For example, the languages can include "C", Java, Pascal, Perl or other programming languages. In one particular embodiment, the program is written in Microsoft Visual Basic 6.0 and is not a standard executable program. Rather, the program is written as an "Active X Control" and maintained as a Dynamic Link Library.

Each programming approach provides a balance of positive and negative results. One of ordinary skill will be able to choose the approach most tailored to the specific needs. However, the "Active X Control" approach provides a balance of advantages that may not be readily apparent to those of ordinary skill in the art. Such advantages include the flexibility of implementing the present invention within any Visual Basic application. Thus, when a sales personnel operates the invention, they actually only execute a small executable program interacting with the "Active X Control".

One embodiment of conversation control application 133 is described in the following paragraphs including executable code for receiving commands from a user, designating the appropriate components from data structure 135, accessing the various components, and present the selected components to a recipient. In particular embodiments of the present invention, upon initiation, conversation control application 133 accesses a file directory like, for example, a Windows system registry for a key indicating the location of a local database. In addition, conversation control application 133 checks the directory for a "key" indicating the location of a SOURCE database. The SOURCE database is the "master" database. The master database should be the latest updated database. If the master database located in the in the location given from the directory is different than the local database the program will copy the source or master database over top the local data base, thus keeping the machine up to date with the latest presentation information. Additional discussion about updating conversation control system 110 is provided below with regard to various flow diagrams.

To provide reliability and speed, some embodiments of conversation control application 133 load all the necessary information about the presentation into RAM or memory on computer 120. Thus, when an operator selects an approach, presentation, and/or script, the invention does not need to access the local hard drive for what to do next. Rather, the invention first looks into the memory on the local machine for a reference in memory as to what should take place upon pressing that key on the keyboard. Again, additional disclosure of the location of files is provided below.

Upon starting conversation control application 133, a login screen is displayed to the user. Based on the selections of the user the program then will go to the, now newly updated, SCRIPT_ITEMS table in the database and get all the "Script Items" that are of type GROUP. For the selected script "script items" are anything in the "Script". A Script is the "Presentation". So we can say that the Script Item is anything that makes up the Script.—A key like the letter "L" for a laugh, the number 3 for "How much does this cost?" or even a grouping of keys such as "L" for a laugh, "R" for Repeat that and "G" for Good!.

Once all the "Script Items" of type "GROUP" are queried and retrieved from the local database the program then puts each record in the record set into an instance of a class for each record in the record set. Each instance is then added to a collection in memory to hold onto that information.

When all the "Script Items" of type GROUP are into a collection the program then queries the SCRIPT_ITEMS table in the database for all "Script items" of type "STANDARD" and "STANDARD-SEQUENCE". These are Script items that do not navigate to another portion of the script. Their purpose is to play a sound and nothing else. The "L" for Laugh would be a "Standard Script Item". The Letter "Y" for Yes would be a "Standard-Sequence Script Item" because it may have up to 99 different Yes' that play one at a time in sequence each time the user presses that letter on the keyboard.

After all the "Script Items" of type STANDARD and STANDARD-SEQUENCE are loaded into a collection then the program queries the SCRIPT_ITEMS table in the database for all the "Script Items" of type "NAVIGATION". All navigation items point to another part of the script or presentation when a key on the keyboard is pressed. Each "NAVIGATION Script Items" is then put into an instance of a class. Each instance of the class is then stored in a Navigation Collection in memory. Conversation control application 133 can then loop through all the STANDARD and STANDARD-SEQUENCE script items assigning them to the proper GROUP in the GROUPS collection that was created above.

Then, in the embodiment, conversation control application 133 loops through the NAVIGATION collection assigning the each NAVIGATION script item in the collection it's proper GROUPS. Once this is complete, there is one NAVIGATION collection in memory that contains what GROUPS of script items belong to each NAVIGATION script item.

Conversation control application 133 can then query the SCRIPTS table in the database to identify which "NAVIGATIONAL script item" is the starting script item. This is necessary for the program to know what screen or "NAVIGATIONAL script item" should be the first to be displayed to the user of the program.

Conversation control application 133 can then add to a history collection the Script Item ID, which is the ID of the "NAVIGATIONAL script item". This can be used to allow a user to back up in a script to a previous script step. Conversation control application 133 can then take the starting script item ID and look for a reference in the "NAVIGATIONAL script items" collection. The reference can then be returned and stored in a temporary instance of a class. That temporary instance of the class can then be used to populate the screen with all text that is to be displayed.

Conversation control application 133 can then display the main screen. The main screen will now display all description "NAVIGATIONAL script item", this description is what the telemarketer would say to the customer on the other end of the telephone, and all "STANDARD and STANDARD-SEQUENCE script items" are displayed in their "GROUPS". After the main screen is displayed and all values have been entered onto the screen, conversation control application 133 can check a location on local File Server to see what audio files for the selected SCRIPT and VOICE have either been changed or available for use and are not currently on the local machines hard disk drive. If conversation control application 133 finds that there are audio files that are different or missing on a hard disk associated with computer 120. If files are missing, they can be copied to the hard disk under direction of conversation control application 133.

In some embodiments, when user 105 presses a key on keyboard 191, conversation control application 133 accesses the "NAVIGATION" collection in memory for a reference to an instance of a class that contains information for that key pressed. If a reference is found, conversation control application 133 determines if the key pressed is a "Navigational" key or just a key that plays the associated audio file. If the key pressed is a "Navigational" key then conversation control application 133 can play the sound associated with the key and then displays the next screen and it's Script items for the selected "Navigational" script item. Alternatively, if the key pressed is a 'STANDARD or STANDARD-SEQUENCE", conversation control application 133 plays the sound associated with the Script item. All audio files that are played during the presentation can be located on the local computers hard disk drive. This can be done to limit the network traffic associated with operation of conversation control system 110, as well as for speed reasons. After handling the pressed key as described above, conversation control application 133 can then await another key press by user 105.

Some embodiments of the present invention can have sixty-eight or more assigned keys to access various approaches, scripts and/or presentations. Furthermore, the present invention provides a graphical user interface (GUI) that is easy to view and identify the location of a specific selection key. For example, if a user is not sure if the letter "L" is for Laugh or for "Loss of Service" on a particular screen it would take longer for the telemarketer to locate the letter "L" because the "L" is the same size and color as the Description of what the key does. Thus, the present invention is easy to quickly view with the eyes and be able to differentiate what the key "L" does for the given screen. This is accomplished by the use of Larger text for the letters, such as "L". The letter "L", in this instance, would also be a different color of text.

Conversation editor application 134 includes executable code for allowing a user or other system administrator to access database 132 and update the various data structures 135 maintained thereon. Thus, for example, conversation editor application 134 can be used to add additional approaches 136 including scripts, script items and presentations. Alternatively, conversation editor application 134 can be used to add, modify, and/or delete various components within data structure 135. Thus, for example, conversation editor application 134 can be used to add another presentation related to script items AAA 144.

Conversation trainer application 135 includes executable code for training a user on the operation of conversation control system 110. Conversation trainer application 135 can include providing a simulated recipient with which a user converses using conversation control system 110. Thus, for example, conversation trainer application 135 can include a tool for executing approach A 136 under direction of a user and in response to simulated recipient actions. Based on the known, simulated recipient actions, a predetermined response from the user is expected. The user enters their responses and is evaluated to determine the ability of the user. In this way, a user can gain valuable experience operating conversation control system 110, without actually being live with a recipient. Further, the results of the simulation can be used by a company to evaluate its sales and/or service personnel.

Referring again to FIG. 1A, I/O devices 190 can be any devices associated with computer 120 for providing input and output to/from computer 120. In some embodiments, a plurality of I/O devices 190 are employed, while in other embodiments, only a single I/O device 190 allowing for input from user 105 is provided. Such I/O devices include, but are not limited to, a keyboard, a mouse, a touch-screen, a microphone, a speaker, a display, and the like. In one particular embodiment, I/O devices 190 include a keyboard, a mouse, a display, and one or more speakers. As will be further evident from the proceeding discussion, many combinations of I/O devices 190 are possible in accordance with the present invention.

Telephone interface 160 can be any interface for accessing and communicating with telephone 180 via telephone network 170 as defined above. In one embodiment, telephone interface is a 56K modem with both audio and data capabilities. In other embodiments, telephone interface 160 is a POT with a computer access port. In yet other embodiments, telephone interface 160 is a POT coupled to a telephone access device allowing the POT to be dialed under control of computer 120 with audio output from computer 120 being provided to the POT and ultimately delivered to telephone 180. Further, in some embodiments, the combination includes ports for providing either or both of the audio input and output capability of the POT directly to user 105. In other embodiments, either or both of the audio input and output capability of the POT is provided via computer 120 and I/O devices 190. It should be noted that many other possibilities exist for providing access to telephone 180 via telephone network 170 in accordance with embodiments of telephone interface 160.

In some embodiments, connection control 140 and/or audio interface 150 are provided in addition to telephone interface 160. Connection control 140 can be any device controlling access to telephone 180 via telephone interface 160. For example, connection control 140 can be an automatic dialing mechanism integrated with computer 120.

Audio interface 150 can be any device for accessing audio data provided to and from telephone interface 160. In some embodiments, audio interface 150 includes a converter for changing digital audio files to analog audio signals for transmission over a POTS network. In addition, audio interface 150 can include a speaker for monitoring audio signals from telephone 180 and converted audio signals from computer 120. In particular embodiments, audio interface 150 is integrated with computer 120, while in other embodiments, audio interface 150 is provided apart from computer 120. In such embodiments, audio interface 150 can be coupled to computer 120 via a Universal Serial Bus (USB) network, or other connector to computer 120.

Figure 2A:
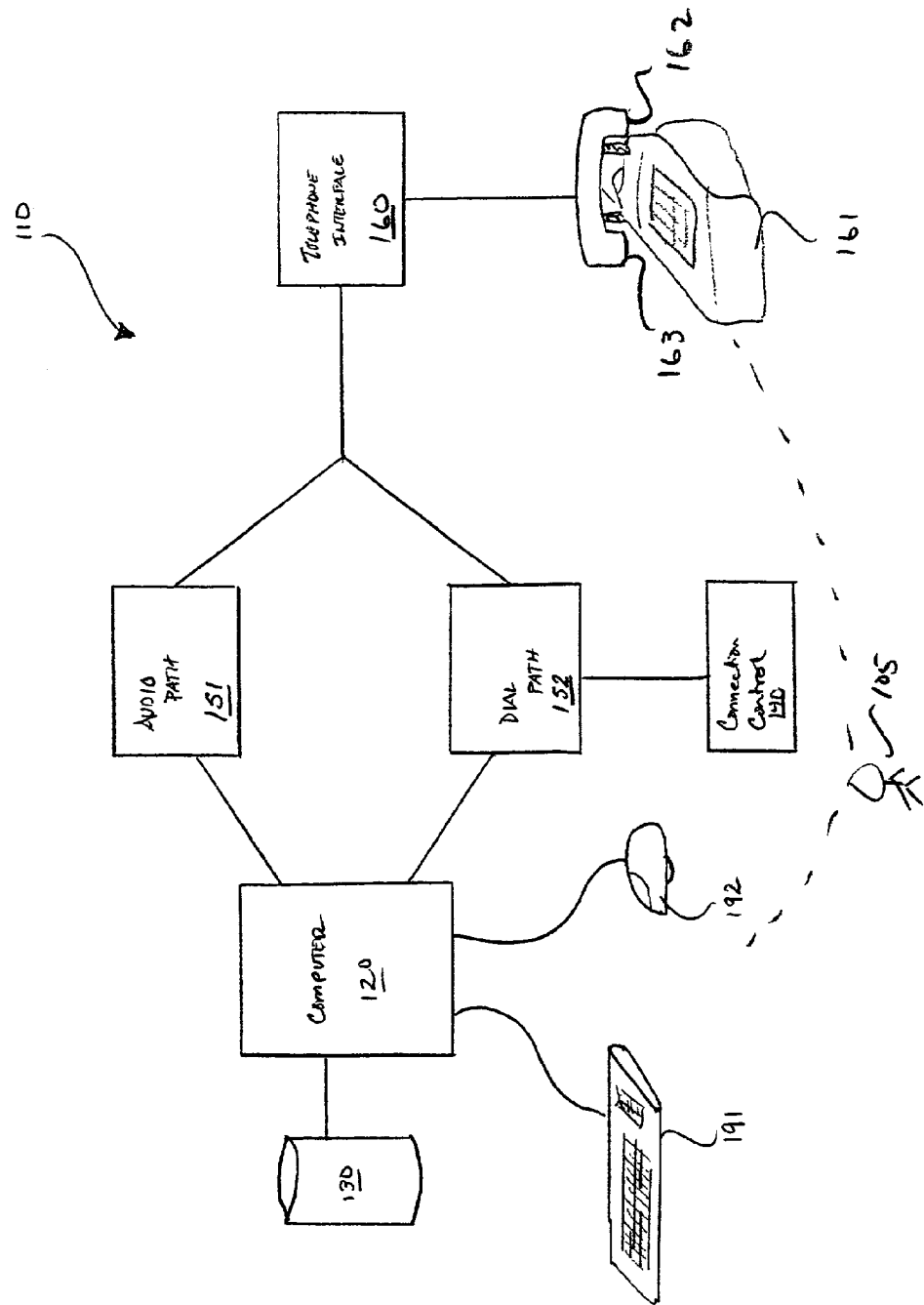
FIG. 2A illustrates an embodiment of a conversation control system in accordance with the present invention.

Referring to FIG. 2A, a block diagram of another embodiment of conversation control system 110 is illustrated. In the embodiment, I/O devices 190 include a keyboard 191 and a mouse 192. Telephone interface 160 provides a connection to a POT 161. Via a receiving speaker 162 of POT 161, a user 105 can monitor an ongoing conversation between a recipient (not shown) and computer 120. Additionally, user 105 can interject conversation into the aforementioned communication using a microphone 163 of POT 161. Connection control 140, computer 120, computer readable medium 130, and telephone interface 160 provide similar functionality to that described in relation to FIG. 1A. Again, it should be noted that connection control 140 can be integral to computer 120 or apart from computer 120. Audio path 151 provides a path whereby audio is provided from computer 120 to the recipient (not shown) via telephone interface 160. Additionally, in some embodiments, audio data from the recipient (not shown) passes to computer 120 via audio path 151. Dial path 152 provides a path whereby data can be passed to and from telephone interface 160. Such data can include control for contacting and connecting with the recipient 9 (not shown) via the telephone network (not shown).

Figure 2B:
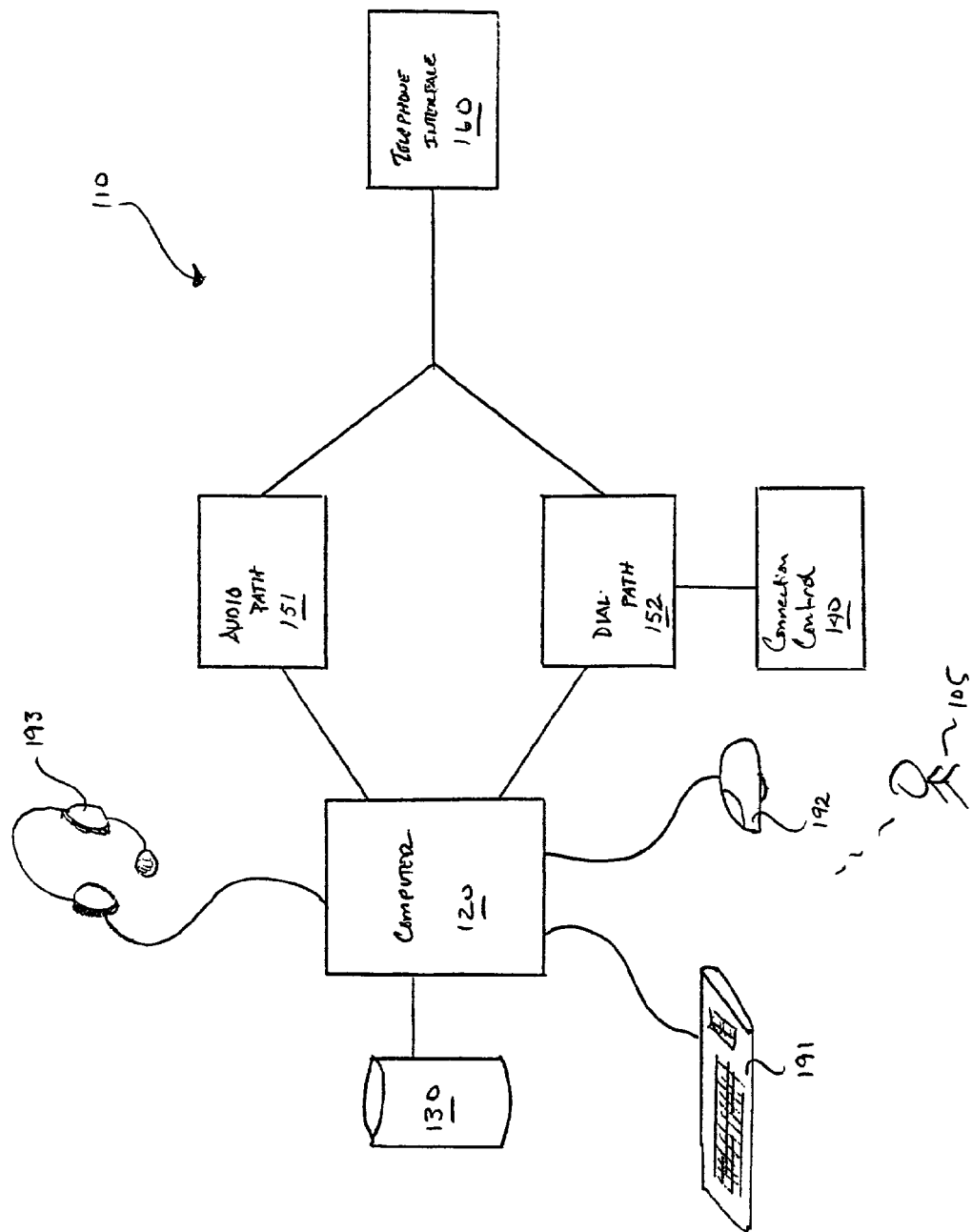
FIG. 2B illustrates another embodiment of a conversation control system in accordance with the present invention.

Referring to FIG. 2B, a block diagram of yet another embodiment of conversation control system 110 is illustrated. In the embodiment, I/O devices 190 include keyboard 191, mouse 192, and a headset 193 with an associated microphone 194. In contrast to the embodiment discussed in relation to FIG. 2A, the speaker and microphone through which the user interacts with the conversation between computer 120 and the recipient (not shown) is associated with computer 120, rather than telephone interface 160.

Figure 3:
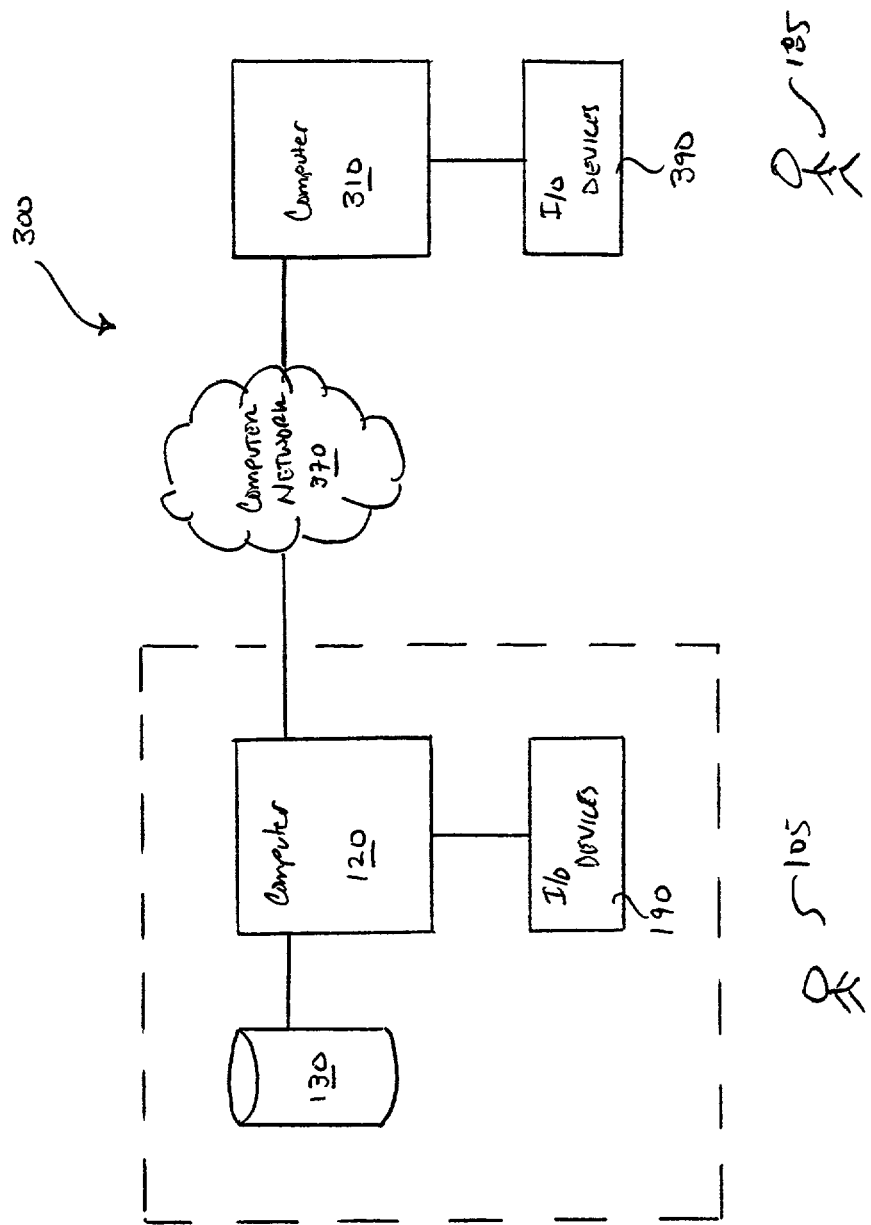
FIG. 3 illustrates yet another embodiment of a conversation control system in accordance with the present invention.

FIG. 3 illustrates an embodiment of a presentation system 300 in accordance with the present invention. Presentation system 300 represents a subset of presentation system 100, where particular devices and networks are utilized. Presentation system 300 includes computer 120 in communication with another computer 310 via a computer network 370. Computer 120 is associated with computer readable medium 130 and I/O device(s) 190 as previously discussed. Computer 310 is similarly associated with I/O devices 390. Presentation system 300 is particularly suited for use in accordance with the present invention where the conversation between recipient 185 and computer 120, under direction of user 105, is a textual conversation provided via displays associated with the respective computers. Alternatively, the conversation could be an audio conversation where computer 310 converts digital audio files transmitted from computer 120 via computer network 370. Further computer 310 can convert audio inputs from recipient 185 for transmission to computer 120 via computer network 370. Similarly, information provided by recipient 185 can be converted by computer 120 to an audio format acceptable to user 105.

In one particular embodiment, the system of FIG. 3 is arranged as a Kiosk, where a recipient inputs a selection in his native language via a keyboard interface. The presentation of the selection is in the native language of the user. The user in turn inputs a selection via conversation control system 110 in the user's native language, and the selection is presented to the recipient in the recipient's native language.

Exemplary Methods

Figure 4A:
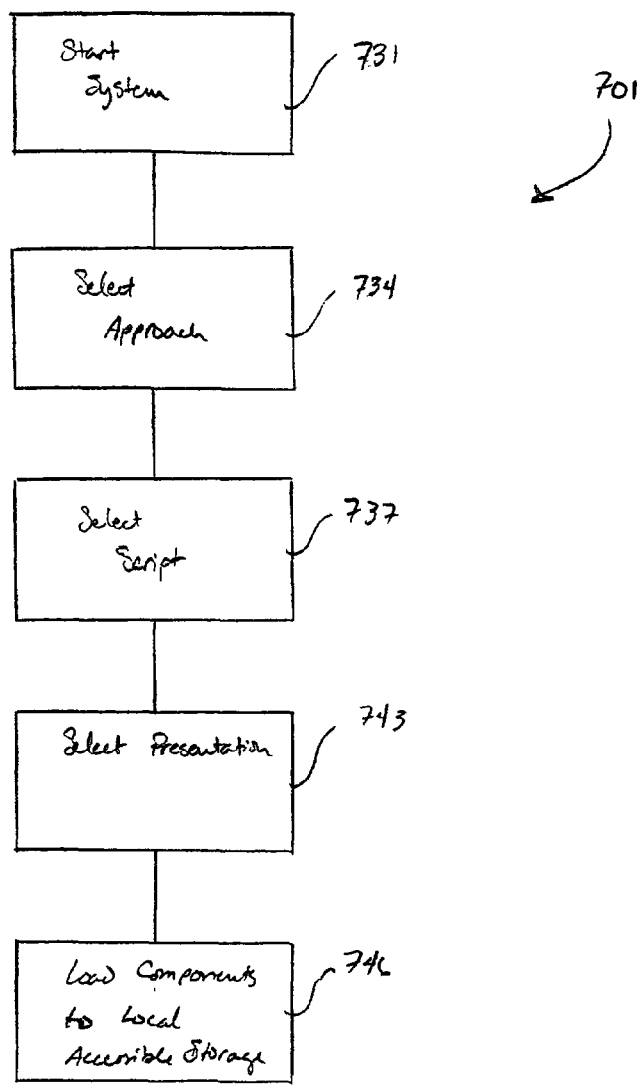
FIG. 4A is a flow diagram in accordance with one embodiment of the present invention for initiating a conversation control system.
Figure 4B:
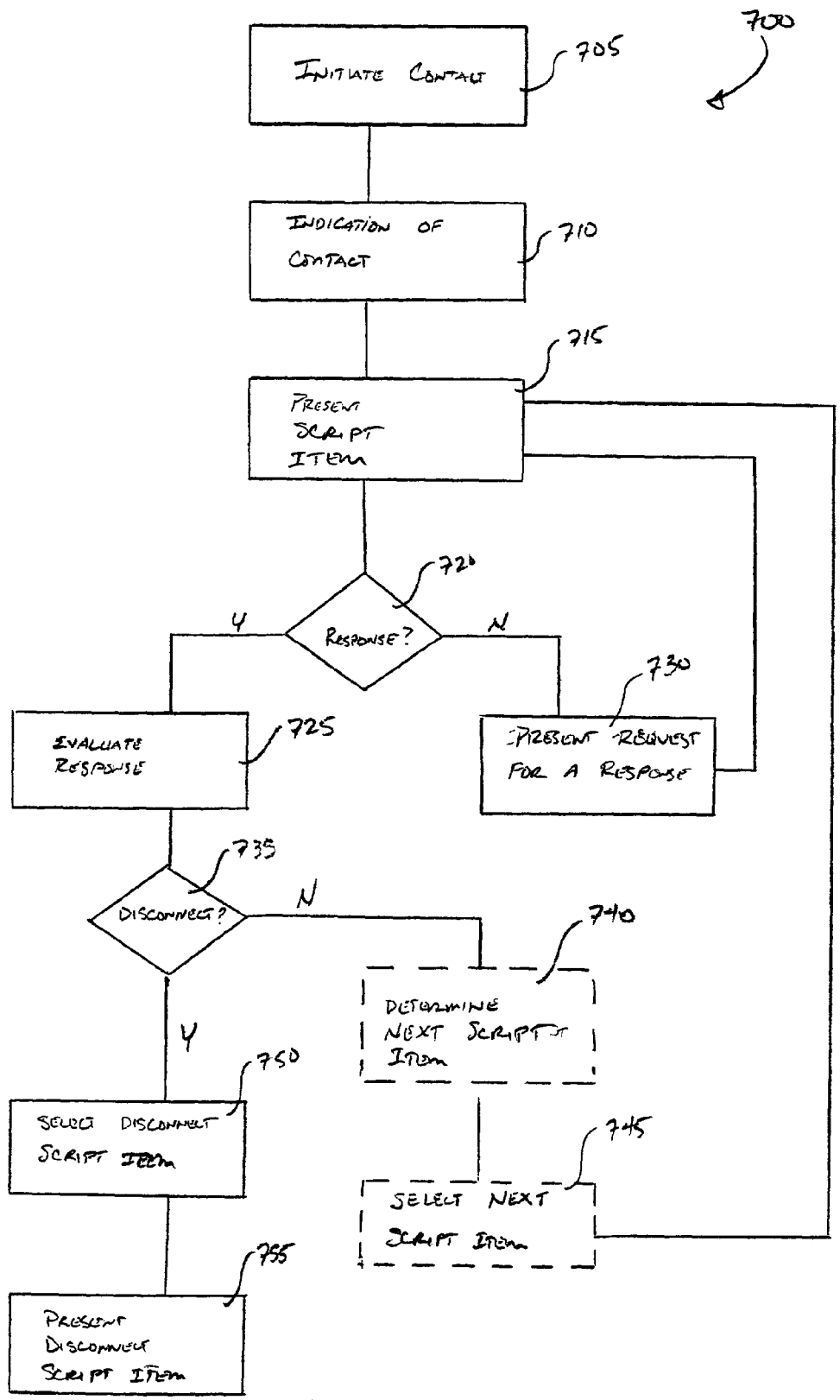
FIGS. 4B and 4C are flow diagrams in accordance with an embodiment of the present invention for operating a conversation control system.
Figure 4C:
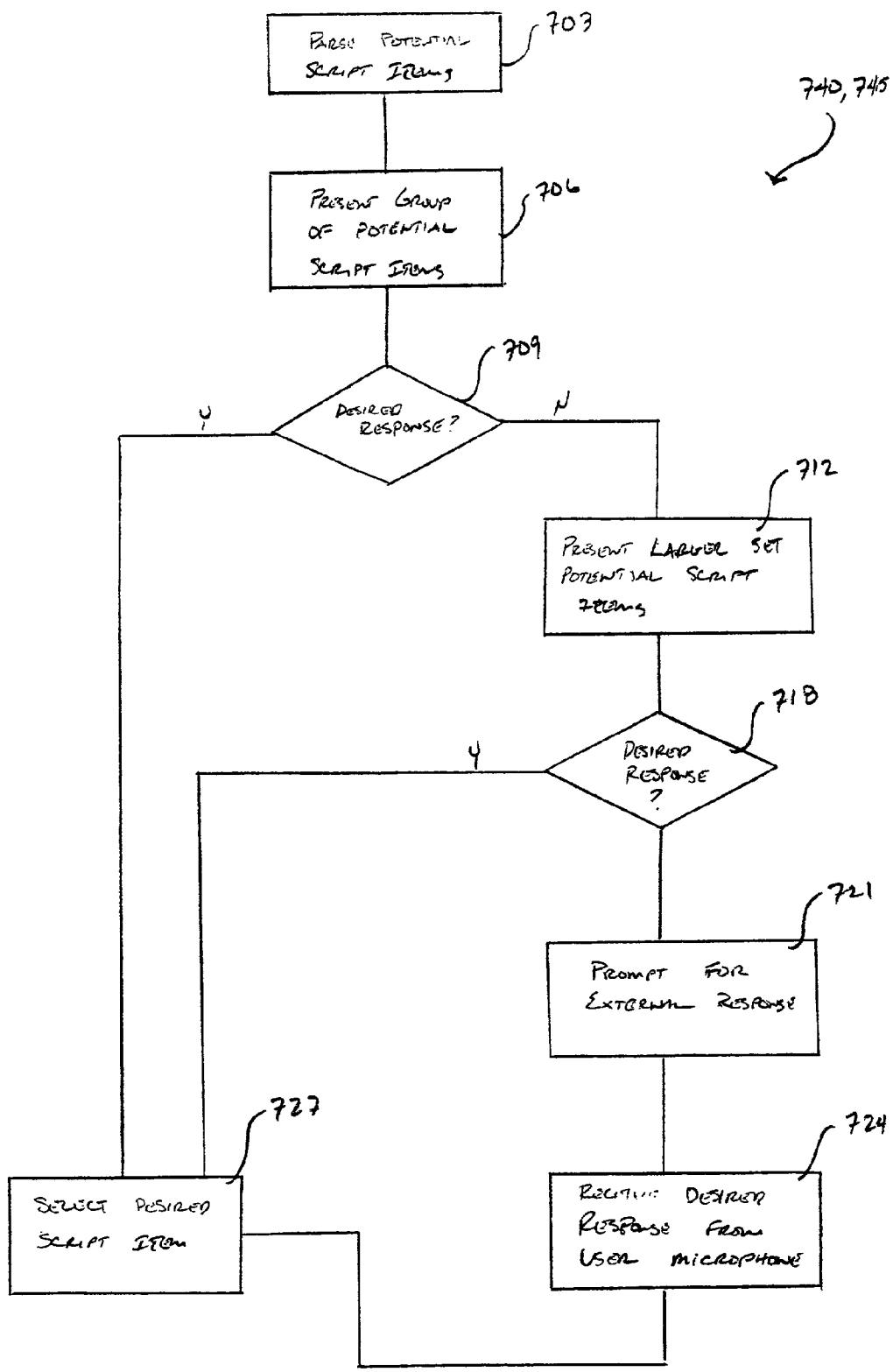

A number of methods may be used in relation to the previously discussed systems. FIGS. 4A-4C illustrate examples of such methods. Of course, it will be recognized that other such methods are possible in accordance with the present invention. Referring to FIG. 4A, a flow diagram 701 of preparing conversation control system 110 for operation is illustrated. Following flow diagram 701, conversation control system 110 is started (block 731). Starting conversation control system 110 can include switching on power and, in some embodiments, logging onto computer 120 by providing a user name and password.

Once conversation control system 110 is started, the various components used in relation to operation are selected. More particularly, such selection of the components can include selection of an approach (block 734), followed by selection of a script (block 737) and then a presentation (block 743). With the components selected, data for operating conversation control system 110 are loaded to a readily accessible portion of computer readable medium 130 (block 746). By loading the components to a readily accessible portion of computer readable medium 130, computer 120 can quickly access the various components during an ongoing conversation, without delaying the conversation unnaturally to allow for an extended amount of time to access a particular element. In some embodiments, the components are loaded onto a hard disk drive integral to computer 120. In yet other embodiments, components are pre-fetched from the hard disk drive to RAM integral to computer 120. Such a pre-fetch operation can be done in anticipation of using the component. Thus, for example, when a particular script is being presented, components associated with execution of the next step of the script can be copied from the hard disk drive to the RAM.

Figure 5:
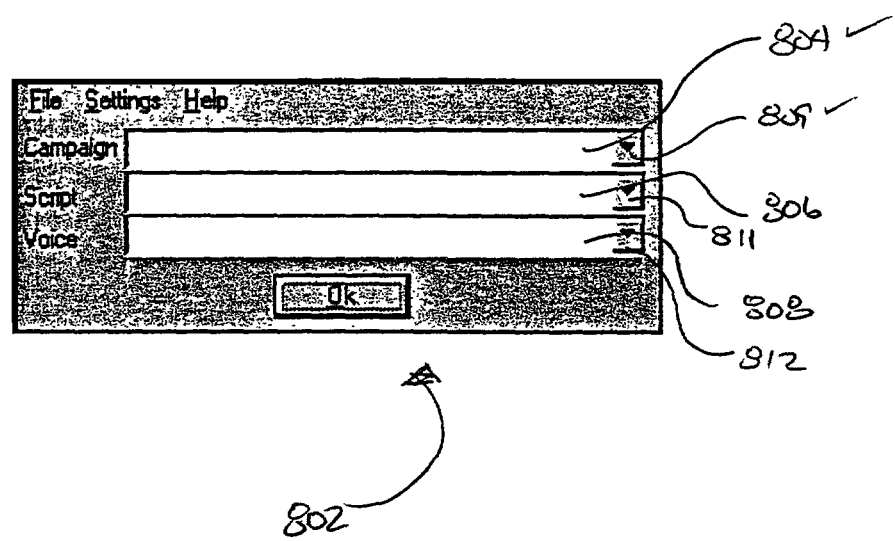
FIG. 5 is an embodiment of a login screen for initiating use of a conversation control system.

Referring to FIG. 5, one embodiment of an interface 802 for selecting the components is illustrated. Interface 802 includes an approach selection box 804 where a particular approach can be entered and thereby selected. A pull down selection 809 is associated with approach selection box 804 allowing user 105 to select a pre-defined approach. In addition, interface 802 includes a script selection box 806 and associated pull down selection 811 for selecting a desired script. Yet further, interface 802 includes a presentation selection box 808 and associated pull down selection 812 for selecting the desired presentation.

Selection of the approach includes selection of a particular group of responses related to a particular product, a sales or service campaign, a telephone survey campaign, or the like. For example, selection of an approach can include selecting a particular sales campaign in which user 105 is involved. More particularly, the approach could be an approach for selling the Rapid City Times Newspaper. Another example may include providing product information related to Company A's appliances. Of course, in accordance with the present invention, approaches for any number of entities are possible. Further, such approaches can involve the sales of particular products, answering consumer questions related to the products, or the like.

Selection of the script can include selection of a particular version of the approach. For example, an approach may include both an aggressive script and a passive script. Alternatively, or in addition, one script of the approach may be directed at a particular socioeconomic class, while another script of the approach is directed at a different socioeconomic class. User 105 can select an approach that is best suited for the recipients 185 that either will be conversed with using conversation control system 110. From the discussion provided herein, it should be recognizes that any number of scripts can be developed for a given approach.

Where conversation control system 110 is providing an audio conversation, selection of the presentation can include selecting the particular voice that will be used to present the scripted portions of the approach. Selection of the voice can include, but is not limited to, selection of the, the language of the voice, and/or the accent of the voice. Further, selection of the voice can include selection of the tone of the voice including, but not limited to, whether the tempo of the voice is upbeat or somber, excited or depressed. In embodiments where conversation control system 110 is providing a textual conversation, selection of the presentation can include selecting the language of the presented script portions. Based on this description, one of ordinary skill in the art will recognize many other presentation options useful in relation to the present invention.

In particular embodiments, recipient 185 and user 105 may speak different languages. In such situations, a presentation in the native language of recipient 185 can be selected. By making such a selection, computer 120 provides audio output in the recipient's language. This is particularly useful in situations where user 105 can read and understand the language of recipient 185, but is hampered with a heavy or otherwise undesirable accent. More particularly, user 105 can monitor and control the conversation via conversation control system 110, while computer 120 actually provides the audio portion of the conversation in the language of recipient 185 and uninhibited by the inability of user 105. Thus, for example, when users 105 are located in India and recipients 185 are in the United States, recipients can be presented with a conversation that includes a United State's accent.

In yet other embodiments, computer 120 and/or telephone interface 160 further provide translation of the recipient's communication into a language known to user 105. In such cases, recipient 185 can be presented with conversation audio in the language and accent of recipient 185, regardless of the language of the user interacting with conversation control system 110. In some embodiments, it is not essential that the translation provided to user 105 be particularly good or even very accurate. Rather, the translation merely needs to alert user 105 to the general thought being presented by recipient 185 and sufficient to guide the user 105 to control the audio response generated by computer 120. While the translation to the user is not perfect, recipient 185 is presented with responses related to their prior comments and in a previously determined, accurate translation into the language of recipient 185.

In yet other embodiments, an accent different from the native tongue of recipient 185 can be selected for a desired theatrical impact. For example, an English accent may be chosen to heighten the interest of a recipient from the United States receiving a telephone call via conversation control system 110. Or, as another example, a Jamaican accent may be used to heighten the interest of a recipient receiving a telephone call via conversation control system 110 and promoting Jamaican vacations. As yet another example, a caring, articulate voice may be selected for providing responses to an "ask a nurse" line implemented using conversation control systems 110.

From preceding discussion, it should be appreciated that a great deal of flexibility in providing and directing conversations are possible in accordance with the present invention. For example, it may be determined that the systems and methods will be used to provide medical information to elderly persons in the Southern United States. In such a situation, an understanding, soft script may be selected, and similarly, a kind female voice speaking English with a southern accent may be chosen for the presentation. Thus, the recipients interacting with conversation control system 110 can be provided an additional degree of comfort not possible through use of a group of human presenters, even where the actual user 105 is in China and does not speak very competent English.

Referring to FIG. 4B, a flow diagram 701 illustrates operation of conversation control system 110 in accordance with embodiments of the present invention. Following flow diagram 701, contact is initiated with recipient 185 (block 705). Such contact can be initiated by providing the recipient's telephone number to computer 120. In some embodiments, this is accomplished by user 105 inputting the telephone number into computer 120 via keyboard 191. In other embodiments, the telephone number is entered directly into telephone interface 160 via, for example, POT 161 as illustrated in FIG. 2A. One will recognize a number of other methods for providing contact information for recipient 185. For example, the contact information may be automatically downloaded from another computer, or the contact information may be an identification for initiating chat over the Internet.

With the telephone number, or other contact information available, recipient 185 is contacted via telephone network 170. In some embodiments, such contact is accomplished by dialing as performed in a POTS. In other embodiments, the contact is initiated by communication with a computer network. It will be appreciated that any method of initiating contact can be used in accordance with the present invention.

Once contact with recipient 185 is achieved, this is indicated to computer 120 (block 710). An indication can be user 105 pressing any key on keyboard 191 upon hearing recipient 185 say "hello", or the like. Alternatively, the indication can be achieved by reception of computer 120 of an audio voice signal. A number of other ways of providing the indication are also possible in accordance with the present invention.

Having confirmed contact with recipient, an initial script item is presented to recipient 185 (block 715). In some cases, the initial script item is a greeting and introduction presented in accordance with the selected presentation. For example, where the greeting is associated with a telemarketing approach, it can be something like: "Hi, I am calling to present you with an unbelievable offer—have you ever heard of company XYZ?" In other embodiments, the initial script item is a response to a recipient initiated call. In such a circumstance, the initial script item can be something like: "Hello, thank you for calling XYZ company customer service—How may I direct your call?"

To present the script item, computer 120 accesses the selected presentation associated with the script item and provides the presentation to recipient. Thus, for example, where the selected presentation is a Chinese language, audio, young male voice presentation, the script item is presented to recipient 185 in Chinese with the voice of a young male. Alternatively, where the selected presentation is a textual presentation, the script item is presented to recipient 185 as text in an appropriate language.

After the initial script item is presented, a response from recipient 185 is awaited (block 720). If no response is received after a given period of time, user 105 can make a selection that causes an additional request for a response to be presented to recipient 185 (Block 730). Further, in some cases, the preciously presented script item can be replayed (block 715) and a response again awaited (block 720).

Alternatively, where a response is received related to the initial script item, user 105 evaluates the response (block 725). As previously discussed, user 105 can receive the response via a display associated with computer 120, or in audio form via speakers 193. Based on the evaluation of the response, user 105 determines if the conversation is over and recipient 185 should be disconnected (block 735). If a disconnect is desired, user 105 selects an appropriate script item to effectuate the disconnect via I/O devices 190 (block 750). Computer 120 then accesses the selected script item and presents it to recipient 185 in a form consistent with the selected presentation (block 755). It should be appreciated that the disconnect can be chosen at any point in the conversation when it becomes appropriate.

If a disconnect is not chosen (block 735), user 105 determines an appropriate script item to be presented in reply to the previous response by recipient 185 (block 740). User 105 then selects the determined script item (block 745) and the selected script item is presented to recipient 185 (block 715). This process of recipient response, selection of an appropriate reply, and presentation of the reply by conversation control system 110 is repeated for each step of the selected script, or until the conversation is ended by a disconnect effectuated as previously discussed.

The following is an exemplary conversation presented using methods in accordance with the present invention. The conversation pieces are noted as either a "REPLY" from conversation control system 110 under direction of user 105, or a "RESPONSE" from recipient 185.

REPLY: "I am Calling from the Carlton Chief Coaching Division. How are you today?"
RESPONSE: "I'm doing well."
REPLY: "Great. I understand you purchased the Carlton Chief no down-payment program sometime ago. Correct?"
RESPONSE: "Correct."
REPLY: "Ok. If you don't mind me asking, have you had the opportunity to use the program to purchase any real estate?"
RESPONSE: "Yes."
REPLY: "I'm happy to hear that you are able to use the program to purchase real estate. Now do you feel that having a personal real estate coach would help you be able to purchase more real estate for no down-payment?"
RESPONSE: "Yes."
REPLY: "Great. For those same reasons we here at the Carlton Chief Coaching Division have come up with a way to best utilize the no down-payment real estate program that you recently purchased, drafting a real estate coaching service that will help you go through the materials, understand them, and be able to go out and purchase real estate for nothing down. What I would like to do is have a representative call you back and explain to you more about the Carlton Chief no down-payment real estate coaching program. The representative will be able to explain how the program works and will be able to answer any additional questions that you may have about the coaching program. What time works better for you, 4:30 or 5:15 P.M. today?"
RESPONSE: "4:30"
REPLY: "Okay. I'll have a representative call you back today at 4:30. I want to thank you for your time. I really appreciate it. A representative will be calling you back at the time we have set up. Until then I ask you to write down 10 real estate goals that you would like to accomplish this year. It's also important that you write those 10 goals down because when the representative calls you back he will go over those goals with you. Thank you for your time and it has been nice speaking with you, and good luck in accomplishing your 10 real estate goals this year."

Referring to FIG. 4C, additional detail related to blocks 740 and 745 of FIG. 4B is illustrated. More particularly, FIG. 4B illustrates a block diagram of determining and selecting the next script item. Following the flow diagram, script items associated with a given approach and script are analyzed to determine a subset of the script items that are to be presented to user 105 as options (Block 703). The subset of script items can be determined in anticipation the recipient's response to a previously presented script item. Thus, for example, where the previously presented script item was presented as: "Hello, how are you this afternoon?" Anticipated recipient responses could be: "Good," "Great," "Not too bad," "Terrible," or the like. Based on these anticipated responses from recipient 185, the following script items could be chosen as part of the next step of the script: "Glad to hear that" or "I am sorry to hear that", or "That is too bad, I wish you were feeling better." In addition to these anticipatory script items, other standard script items can also be included with the next step of the script: "Yes," "No," "Laugh," "Company Name" (e.g. where it is common for recipient 185 to question "who is this again"), "Would you please repeat that," "Great," "Uh huh," "OK," "Exactly," "I'm doing fine," and the like. It should be recognized that the determined script items can include any number of items and any combination of anticipatory script items and standard script items.

Figure 6:
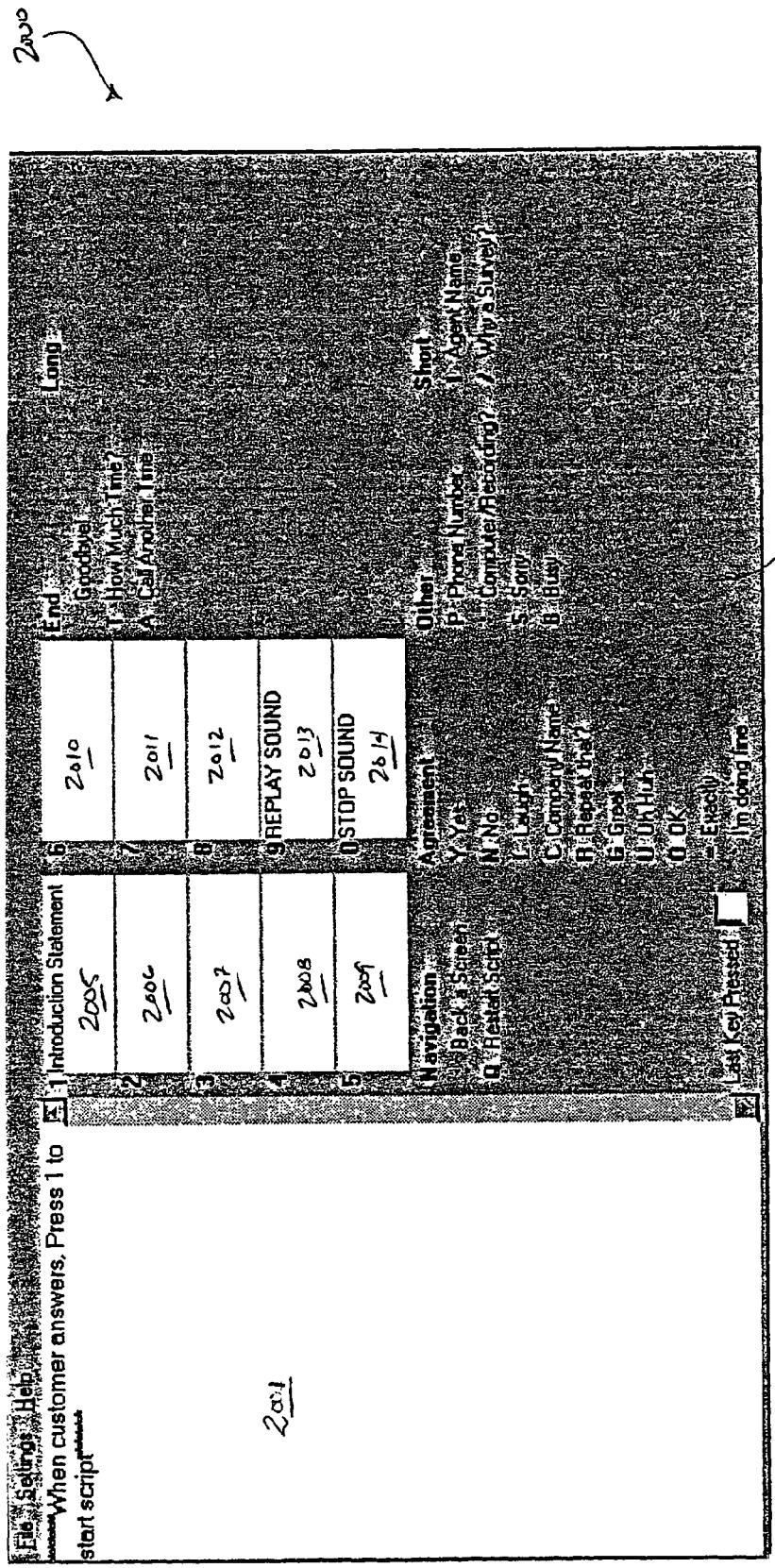
FIG. 6 is an embodiment of an interface for operating a conversation control system.

The determined script items are presented to user 105 via a display associated with computer 120 (block 706). FIG. 6 illustrates one embodiment of an interface 2000 for presenting the various script items to user 105. Interface 2000 includes a general direction window 2001 including instructions directing user 105 on the next step to the approach. In this illustration, the next step is to wait for a contacted recipient to respond by, for example, answering the telephone by saying "hello," or the like. In response, user 105 can select any of numbers zero through nine to answer the recipient with an audio statement as indicated in boxes 2005, 2006, 2007, 2008, 2009, 2010, 2011, 2012, 2013, 2014, respectively. As illustrated, only boxes 2005, 2013 and 2014 are active for the initial step of the script where the introduction statement is to be presented upon selection of the number one on keyboard 191. As per the instructions in window 2001, when the recipient answers, user 105 presses number one on keyboard 191, and in turn, an introduction statement is presented to the recipient.

In subsequent steps of the selected script, boxes 2005, 2006, 2007, 2008, 2009, 2010, 2011, 2012, 2013, 2014 are filled with anticipatory responses. Thus, using the example presented above, box 2005 could include the anticipatory script item "Glad to hear that", while boxes 2002 and 2003 include the anticipatory script items "I am sorry to hear that" and "That is too bad, I wish you were feeling better", respectively. Thus, in reply to the anticipated response from recipient 185, user 105 could select any of numbers one, two or three on keyboard to cause the associated script item to be presented to recipient 185 by conversation control system 110.

In addition to the anticipatory script items 2005, 2006, 2007, 2008, 2009, 2010, 2011, 2012, 2013, 2014, a number of standard conversational script items 2010 are provided. Such standard script items can be presented with each step of the selected script and can include, but are not limited to, "Yes," "No," "Laugh," "Company Name" (e.g. where it is common for recipient 185 to question "who is this again"), "Would you please repeat that," "Great," "Uh huh," "OK," "Exactly," "I'm doing fine," and the like. In some embodiments, these standard script items are associated with hot keys. Thus, for example, as illustrated the simple statement "Yes" is associated with a capital "Y" on keyboard. When "Y" is depressed on keyboard 191, the phrase "Yes" is presented to the recipient by conversation control system 110.

Referring again to FIG. 4C, user 105 determines if an appropriate reply is provided as part of the anticipatory and standard script items (block 709). If an appropriate response is presented, user 105 selects one or more of the script items (block 727). Then the selected script item(s) are presented to recipient 185 as previously discussed in relation to block 715.

Alternatively, where the desired reply is not presented to user 105 (block 709), user 105 can query for additional responses and a larger subset of script items can then be presented (block 712). If an appropriate reply is available from the larger subset of script items (block 718), user 105 can select the desired script item(s) (block 727), and the selected script item(s) are then presented to recipient 185 (block 715).

Where an appropriate reply still is not available (block 718), user 105 can override conversation control system 110 by pressing a predefined override hot key on keyboard 191 (block 721). When conversation control system 110 is overridden, microphone 194 becomes active and user 105 is allowed to speak directly with recipient 185 (block 724). In some cases, such an override is never allowed, while in other cases, such an override is preceded by a statement from conversation control system 110 to recipient 185 saying, for example, "hold on just a minute, let me put my supervisor on the line." Such a statement makes it appear to recipient 185 as if a conference has been joined and that they will receive a response to their difficult question directly from a supervisor. With the response given directly from user 105, a "no response" is selected from conversation control system 110 (block 727), which results in no presentation to recipient 185 via conversation control system 110 (block 715).

Other Exemplary Systems and Methods

Figure 7:
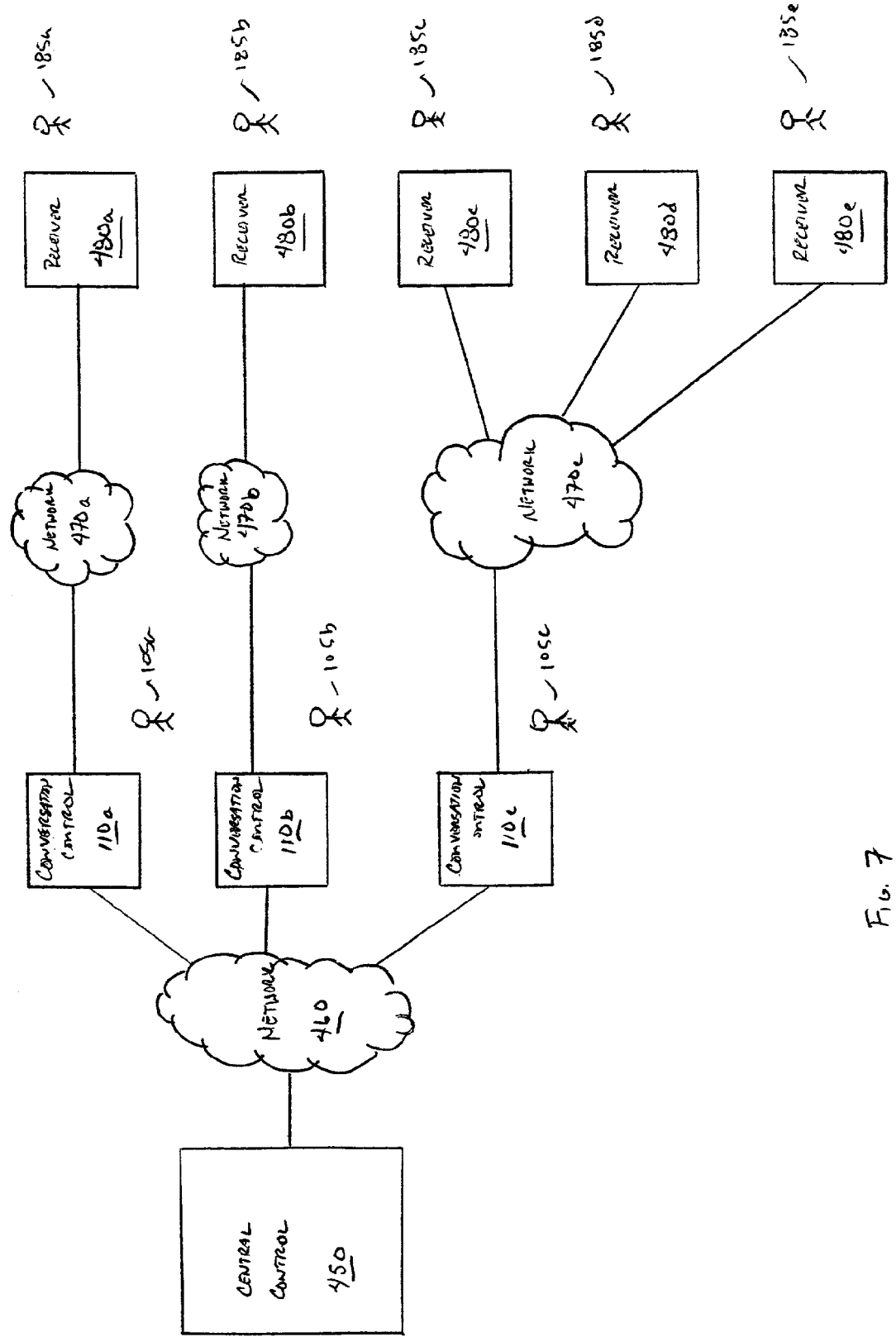
FIG. 7 illustrates a network of conversation control systems in accordance with embodiments of the present invention.

FIG. 7 illustrates a network 400 of conversation control systems 110. Network 400 includes a number of conversation control systems 110*a*, 110*b*, 110*c* operated by respective users 105*a*, 105*b*, 105*c*. Conversation control systems 110*a*, 110*b*, 110*c* each communicate with a common central control 450 via a network 460. In addition, each conversation control system 110*a*, 110*b*, 110*c* communicates with one or more receivers 480*a*, 480*b*, 480*c*, 480*d*, 480*e* via networks 470*a*, 470*b*, 470*c*, respectively. Receivers 480*a*, 480*b*, 480*c*, 480*d*, 480*e* are accessible to recipients 185*a*, 185*b*, 185*c*, 185*d*, 185*e*, respectively.

Receivers 480 perform the function of telephone 180 discussed in relation to FIG. 1A. Thus, receivers 480 can be any type of device capable of receiving and presenting audio, data, and/or textual information to/from recipient 185. For example receivers 480 can be a cellular telephone, a Plain Old Telephone (POT), a Personal Digital Assistant (PDA) with audio output capabilities, a Personal Computer (PC) with audio output capabilities, or any other such device.

Central control 450 can be any microprocessor-based device or system that maintains and provides information relevant to one or more conversation control systems 110. For example, Central control 450 can be a webserver maintaining an updated version of a variety of approaches, scripts, script items, and/or presentations. Further, central control 450 can include an updated list of recipients to be contacted as well as an ability to accept feedback from the various conversation control systems 110. Based on the disclosure provided in this document, one of ordinary skill in the art will recognize other possible elements that can be provided by central control 450 and/or useful in relation to central control 450. For example, central control 450 may further comprise an order entry engine for allowing users 105 to enter orders obtained by contacting recipients 185. Further, it should be recognized that central control 450 can provide a variety of functions useful to a multilevel marketing company, where users 105 are sales representatives maintaining conversation control systems 110, and the multilevel marketing company provides and maintains central control 450 and the functionality associated therewith.

Thus, as just one example, user 105 can contact central control 450 via network 460 and download to conversation control system 110 a list of potential recipient contacts. Such contacts can include both name and telephone numbers. In addition, user 105 can download any of the available approaches, scripts, script items and/or presentations useful in relation to selling a particular product to a recipient 185. Thus, an autonomous user 105 can be provided with the tools to sell products for an entity that maintains central control 450.

Network 460 can be any communication network providing access to central control 450 by conversation control systems 110 under direction of users 105. In particular embodiments, network 460 is the Internet. However, other networks are possible in accordance with the present invention. For example, network 460 can include, but is not limited to a Virtual Private Network (VPN), a Wide Area Network (WAN), a dial-up network, a Local Area Network (LAN), an optical network, a POTS network, a cellular telephone network, or the like.

Networks 470 are similar to telephone network 170 as described in relation to FIG. 1A. Thus, networks 470 can be any communication networks capable of communicably coupling conversation control systems 110 to receivers 480. In some cases, networks 470 are POTS networks, while in other cases, networks 470 a cellular telephone networks, or computer networks. Further, it will be appreciated that a number of different network types are possible in accordance with the present invention. Yet further, networks 470 can each be different network types. Thus, for example, network 470*a* can be a POTS network, network 470b can be a cellular telephone network, and network 470c can be a computer network.

As illustrated by conversation control system 110c, conversation control systems can be attached to more than one receiver 480c, 480d, 480e via network 470c. Thus, for example, where a conference call is desired, conversation central control 110 can contact each of receivers 480c, 480d, 480e contemporaneously and carry on a conversation where responses are received from each of recipients 185c, 185d, 185e and replies provided by computer 120 associated with conversation control system 110c and under direction of user 105c. Using such an approach, each of recipients 185c, 185d, 185e can benefit from the input of the other recipients and replies provided by computer 120. Further, such an approach can be provided in a chatroom situation where the conversation is carried on as a textual conversation.

From the disclosure provided herein, it will be recognized that a number of configurations of network 400 are possible in accordance with embodiments of the present invention. For example, a plurality of central controls 450 can be provided representing a number of different entities. Such central controls 450 can each be accessed by conversation control systems 110. Thus, a user 105 of a control system 110 can offer products and/or services for a variety of different entities by accessing the particular central control 450 of the entity, and downloading approaches, scripts, script items, and/or presentations, associated with products and/or services of the particular entity.

Figure 8:
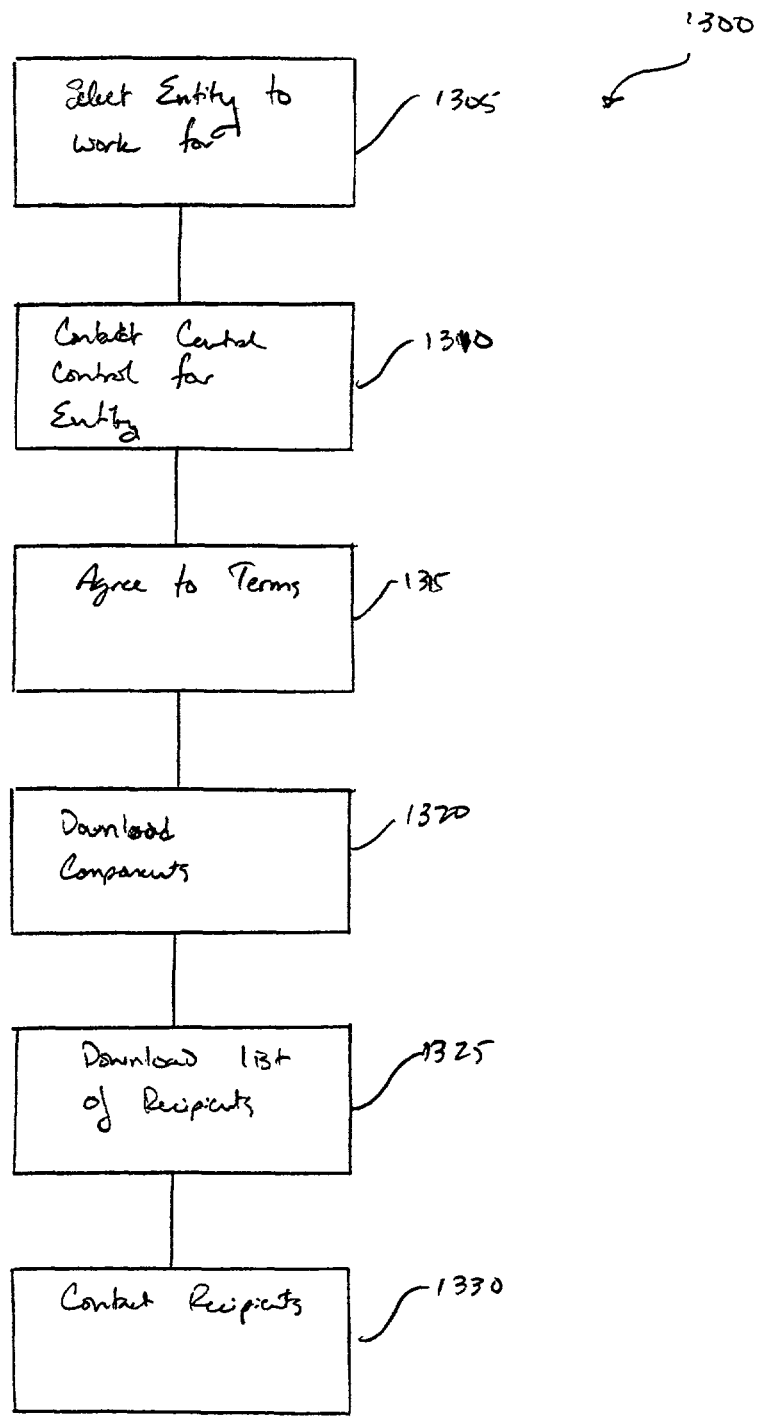
FIG. 8 illustrates a flow diagram describing a process of updating conversation control systems in accordance with the present invention.

FIG. 8 illustrates a flow diagram 1300 describing a process of updating conversation control system 110 in accordance with the present invention. Following flow diagram 1300, user 105 determines which entity(s) that user 105 would like to represent (block 1305). User 105 then contacts the central control 450 for the particular entity(s) (block 1310). The entity can then require user 105 to agree to various terms governing the use of the entity's information or other such business related agreements (block 1315). Once user 105 has agreed to the terms, user 105 downloads the various components used to represent the entity via conversation control system 110 (block 1320). Such components can include various scripts, script items and presentations. In addition the components can include an executable training program. In some instances, a user may be required to obtain a particular score on the training program before beginning any representation of the entity.

In some case, user 105 can also download a list of recipients 185 that need to be contacted (block 1325). In other embodiments, user 105 provides their own list of recipients. The downloaded components are provided to conversation control system 110, a recipient 185 is contacted, and a conversation is had between user 105 and recipient 185 in accordance with the downloaded script and presentation (block 1330).

Figure 9:
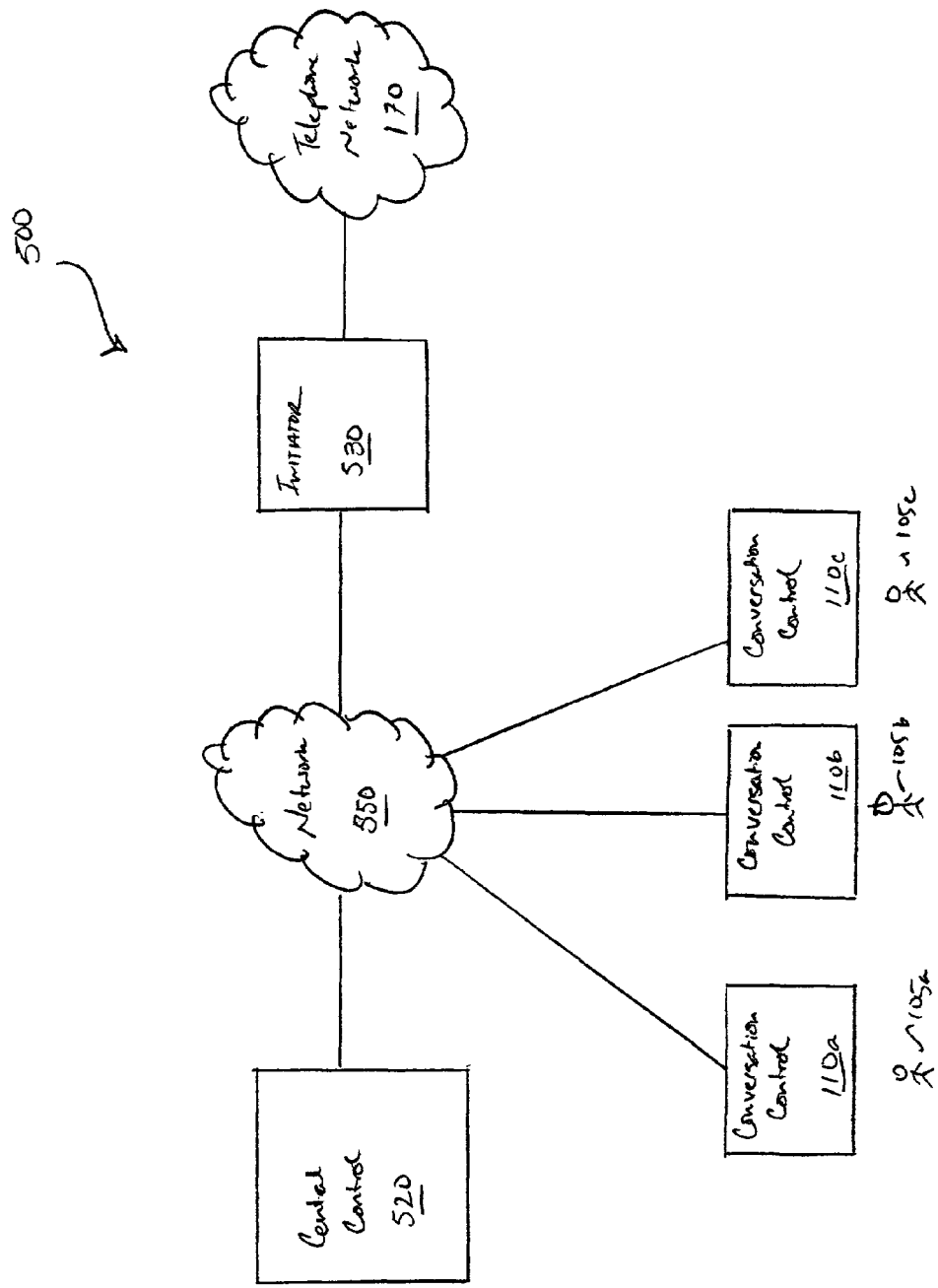
FIG. 9 illustrates a call center environment including various conversation control systems.

FIG. 9 illustrates a call center environment 500 including systems and methods in accordance with the present invention. Call center environment 500 includes a number of conversation control systems 110a, 110b, 110c. In addition, call center environment 500 includes a central control in communication with an initiator 530 and conversation control systems 110 via network 550. Initiator 530 initiates contact with one or more recipients (not shown) via telephone network 170 as described in relation to FIG. 1A.

Using such a configuration, central control 520 can download a particular approach, script and/or presentation to one or more of conversation control systems 110. Thus, control of the approaches presented by users in conjunction with conversation control systems 110 can be updated from a single central control. 520. This allows a system administrator using central control 520 to edit the various components and subsequently cause an update of all of the components across conversation controls 110.

Further, in some embodiments using such a configuration, a single central control 520 can be used in relation to hundreds of conversation control systems 110. In operation, central control 520 can provide contact information for recipients to initiator 530, which in turn contacts recipients via telephone network 170. Once contacted, the recipients are routed to an available conversation control system 110, where their conversation is continued.

Figure 10A:
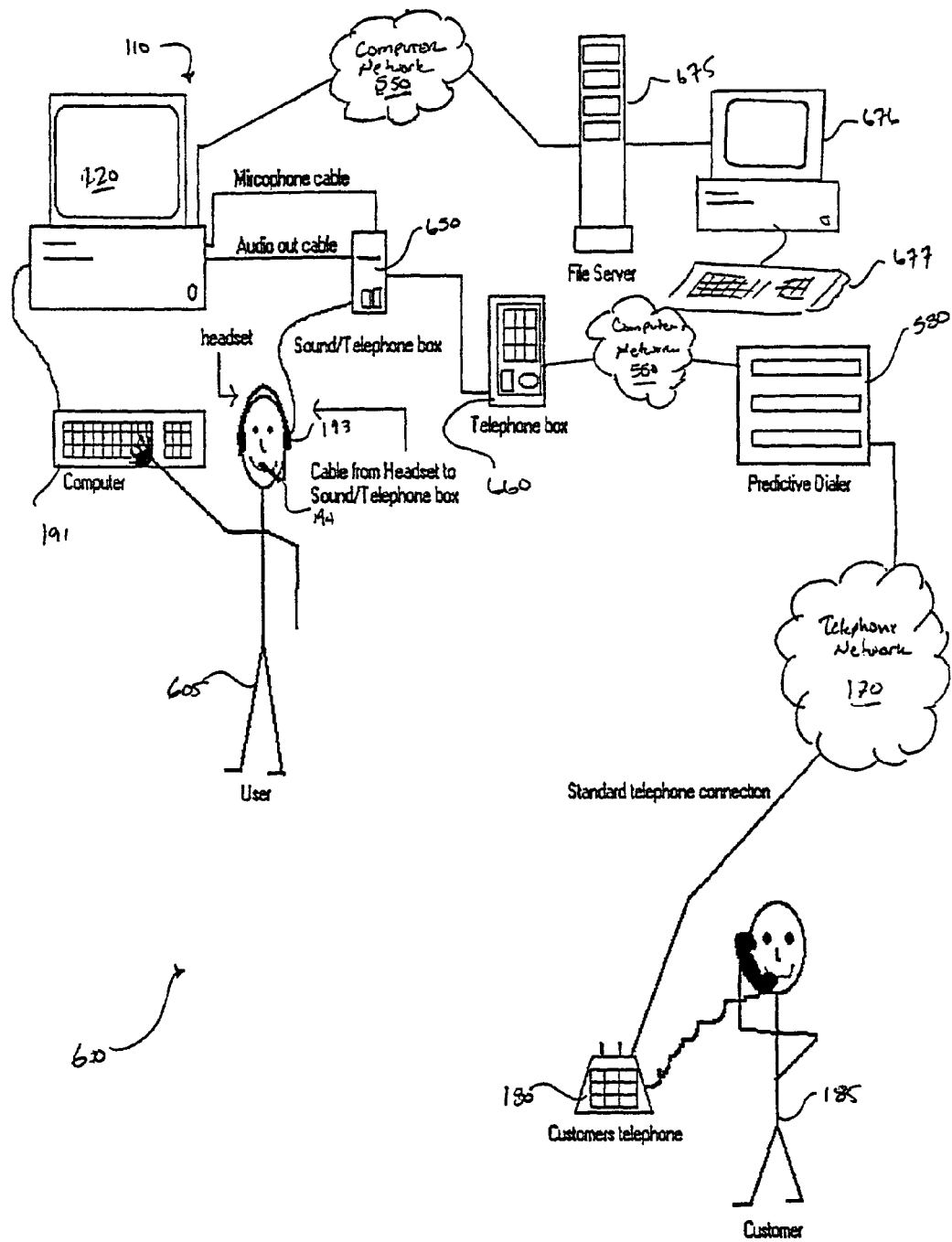
FIG. 10A is a schematic diagram of a conversation control system integrated with the call center environment of FIG. 9.

FIG. 10A illustrates a schematic diagram 600 of call center environment 500. As illustrated, central control 520 is comprised of a file server 675 and a computer 676 with an I/O device 677. File server 675 can maintain an updated version of all components useful in relation to operating conversation controls 110. Such components can be modified, added, and/or deleted by a system administrator, utilizing computer 676. Such components are also accessible to conversation control systems 110.

Conversation control systems 110 include computer 120 along with associated keyboard 191. Computer 120 is communicably coupled to a sound/telephone box 650 that provides for multiplexing of an ongoing conversation. In some embodiments, sound/telephone box 650 is a Plantronics MX10 device. User 105 interacts with computer 120 via the keyboard, and with the audio of an ongoing conversation via speaker 193 and microphone 191 coupled to sound/telephone box 650. Sound/telephone box 650 is communicably coupled to a telephone box 660 that provides access to initiator 530 via computer network 550. In some embodiment, initiator 530 is a predictive dialer.

A predictive dialer can determine the number of users 105 that are prepared to moderate a conversation using conversation control system 110. Then, the predictive dialer begins a number of recipient contacts based on a prediction of the number of recipients that will actually answer and the number of available users 105. Thus, for example, for every available user, a predictive dialer may attempt contact with two recipients 185. Further, in some embodiments, the predictive dialer can be updated with information indicating the progress of each of users 105 progressing along various scripts. In these embodiments, the predictive dialer can further anticipate when users 105 will come available and used that information in predicting when to initiate additional contacts with recipients 185. In this way, the predictive dialer can assure that time of users 105 is maximally occupied.

Under direction from central control 520 (in this case, file server 675), initiator 530 contacts recipient 185 via telephone network 170 and telephone 180. After recipient 185 is contacted, audio communication from recipient 185 is routed to conversation control system 110 via computer network 550. The conversation is then controlled by user 105 as previously described.

Figure 10B:
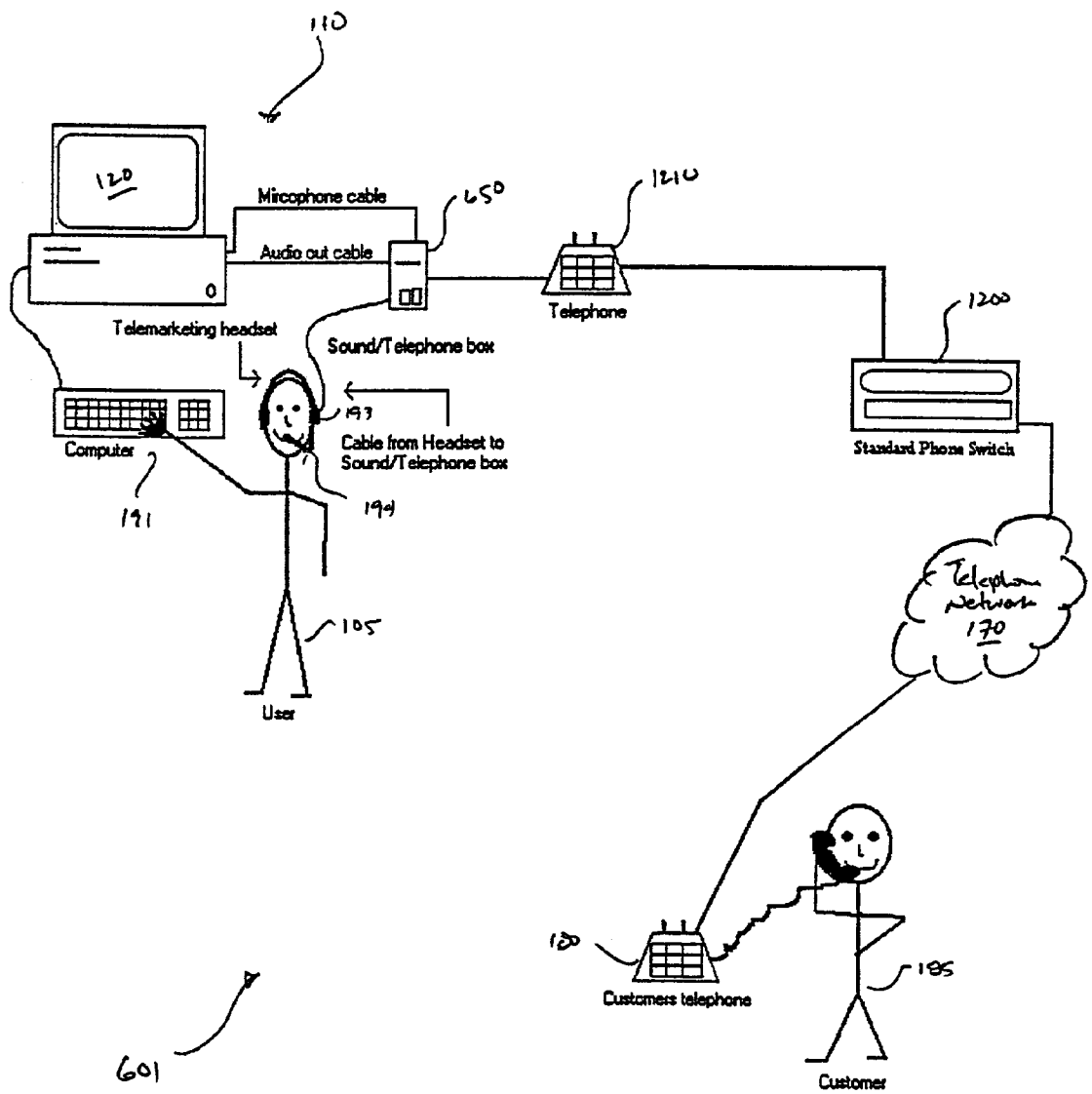
FIG. 10B is a schematic diagram illustrating an embodiment of the present invention where a conversation control system is operated as a stand alone system.

FIG. 10B illustrates a schematic diagram 601 of stand alone system in accordance with another embodiment of the present invention. As illustrated, schematic diagram 601 is comprised of a conversation control system 110 including a telephone 1210, sound/telephone box 650, phone switch 1200 in communication with recipient 185 via telephone network 170 and telephone 180. As illustrated, conversation control system 110, under control of user 105, can operate without connection to a file server 675 shown in FIG. 10A.

Figure 11:
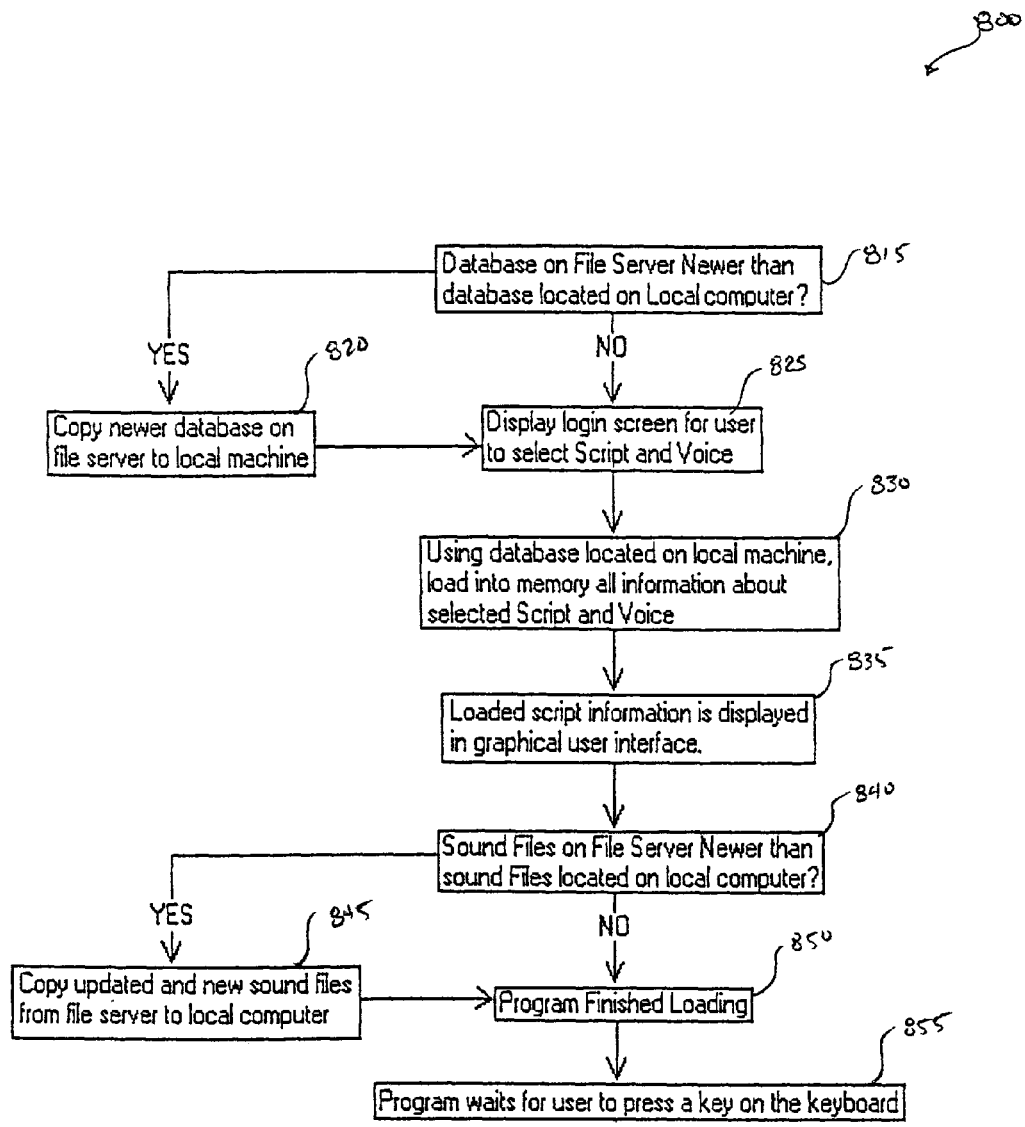
FIG. 11 illustrates a flow diagram of a method in accordance with the present invention for automatically updating a conversation control system.

FIG. 11 illustrates a flow diagram 800 of a method in accordance with the present invention for automatically updating a conversation control system 110 from file server 675. According to the illustrated embodiment, the components including approaches, scripts and presentations are accessed from file server 675 and executed from computer readable medium 130 associated with conversation control system 110.

As illustrated, file server 675 queries computer readable medium 130 to determine if the components on file server are more current than comparable components on conversation control system 110 (block 815). If the components are more current on file server 675, then the newer components are automatically downloaded to conversation control system 110 (block 820). Once the components on conversation control system 110 are current with file server 675, conversation control system 110 is ready to be operated by user 105.

A login screen similar to that illustrated in FIG. 5 is provided to allow user 105 to select the desired approach, script, and presentation (block 825). Once the login is performed, computer 120 queries computer readable medium 130 and loads the selected components into a local storage that is quickly and readily accessible to computer 120 (block 830). A graphical user interface is then displayed to user 105 via a display associated with computer 120 (block 835). Such a graphical display can include a listing of the selected components, a brief discussion of the purpose of the approach, and the first group of messages to be selected from as part of the chosen script.

Once the script information has been displayed, it is determined if presentation components local to conversation control system 110 are current (block 840). If it is determined that more current presentation components are available from file server 675, the more current items are copied to conversation control system 110 (block 845). Once this has been completed, the program for executing the selected conversation using conversation control system 110 is finished (block 850). At this point, the program awaits user 105 pressing any key on the keyboard to indicate that they are ready to proceed (block 855).

Conclusion

As can now be appreciated, systems an methods according to the present are useful in relation to a number of different situations. For example, among others, the systems and methods according to the present invention can be used in a telemarketing situation where a consistent, directed approach is desired. A script and presentation can be provided to engage a recipient in conversation. A users intellect is utilized to parse the conversation, and the conversation control system is used to direct and provide the user's portion of the conversation. Thus, in some embodiments of the present invention, a human mind is utilized to provide a human feel, yet the conversation control system assures a consistent approach.

This is but one example of many. From this disclosure, one of ordinary skill in the art will recognize many, many other applications of the systems of the present invention. From the foregoing one of skill in the art will appreciate many advantages of the present invention. As some examples, the present invention provides for maintaining consistent approaches, scripts and/or presentations related to a particular topic. Furthermore, the approach avoids potential awkwardness potentially associated with speech output. The presentation can be a natural prerecorded voice or computer-generated voice across a telephone presented in such a way that the person receiving the presentation considers the entity giving the presentation to be human. Alternatively, the presentation can be both graphical and voice generated for processing across the Internet or other communication network providing similar functionality.

The invention has now been described in detail for purposes of clarity and understanding. However, it will be appreciated that certain changes and modifications may be practiced within the scope of the appended claims. Thus, although the invention is described with reference to specific embodiments and figures thereof, the embodiments and figures are merely illustrative, and not limiting of the invention. Rather, the scope of the invention is to be determined solely by the appended claims.

What is claimed is:

1. A network of conversation control systems, the network comprising:
a first conversation control system, wherein the first conversation control system includes a plurality of script items formed in a presentation, wherein the first conversation control system is accessible to a first human operator, wherein the first conversation control system is operable to receive input from the first human operator, wherein the input from the first human operator selects one of the plurality of script items, and wherein the first conversation control system is operable to perform the selected one of the plurality of script items to a first human recipient;
a second conversation control system, wherein the second conversation control system includes the plurality of script items formed in the presentation, wherein the second conversation control system is accessible to a second human operator, wherein the second conversation control system is operable to receive input from the second human operator, wherein the input from the second human operator selects one of the plurality of script items, and wherein the second conversation control system is operable to perform the selected one of the plurality of script items to a second human recipient; and
a central control, wherein the central control is communicably coupled to the first and the second conversation control systems.

2. The network of claim 1, the network further comprising:
an initiator, wherein the initiator is communicably coupled to the central control.

3. The network of claim 2, wherein the initiator is a predictive dialer.

4. The network of claim 1, wherein the central control comprises a set of components, and wherein the set of components is copied to both the first conversation control system and the second conversation control system under direction of the central control.

5. A method for providing information to one or more recipients, the method comprising:
providing a first conversation control system, wherein the first conversation control system includes a computer readable medium associated with the first conversation control system, and wherein the computer readable medium associated with the first conversation control system includes a plurality of preformed script items;
providing a second conversation control system, wherein the second conversation control system includes a computer readable medium associated with the second conversation control system, and wherein the computer readable medium associated with the second conversation control system includes the plurality of preformed script items;
providing an initiator;
communicating with the initiator, wherein a human recipient is contacted;

selecting one of the first conversation control system or the second conversation control system to interact with the human recipient;

receiving an indication of one of the plurality of preformed script items from a human operator associated with the selected conversation control system; and communicating with the recipient via the selected conversation control system.

6. The method of claim 5, wherein the initiator is a predictive dialer.

7. The method of claim 5, the method further comprising:

maintaining components for use by the first and second conversation control systems on a central control; and updating both the first and second conversation control systems with the components.

8. The method of claim 7, the method further comprising:

determining if a component on the first conversation control system is less recent than a component on the central control.

9. The method of claim 5, wherein the conversation control system comprises:

a computer associated with a database, wherein the database comprises one or more audio files;

a speaker, and a input device.

10. The method of claim 9, wherein communicating with the recipient comprises:

receiving a first audio signal from the recipient; and outputting the first audio signal via the speaker to a user.

11. The method of claim 10, the method further comprising:

receiving a selection from the user at the input device of the first conversation control system, wherein the selection designates an audio file; and converting the audio file to a second audio signal; and outputting the second audio signal to the recipient.

12. A method for controlling a network of conversation control systems, the method comprising:

initiating contact with a human recipient via an initiator;

selecting a conversation control system, wherein the conversation control system is accessible to a human operator;

routing information received from the human recipient to the conversation control system;

outputting the information received from the human recipient in the form of an audio communication via an output device of the conversation control system to the human operator;

receiving an indication from the human operator of a preformed script item to respond to the information received from the human recipient; and presenting the script item to the human recipient.

13. The method of claim 12, the method further comprising receiving an indication of a script, wherein the script item is associated with a step of the script.

14. The method of claim 13, the method further comprising:

receiving an indication of a presentation, wherein the presentation controls the form that the script item is presented to the recipient, and wherein the presentation is a logical combination of script items.

15. The method of claim 14, wherein the indicated presentation is a voice presentation.

16. The method of claim 15, wherein the voice presentation is a particular person's voice.

17. The method of claim 16, wherein the person's voice is pre-recorded.

18. The method of claim 14, wherein the indicated presentation is the recipient's language.

19. The method of claim 18, wherein the recipients language is not the user's language.

20. The method of claim 12, wherein the initiator is a predictive dialer.

21. The method of claim 12, wherein selecting the conversation control system is done by determining which of a plurality of conversation control systems is currently not in use.

22. The method of claim 12, wherein selecting the conversation control system is done by determining which of a plurality of conversation control systems is about to terminate use.

23. The method of claim 12, the method further comprising:

providing a central control, wherein selection of the conversation control system is effectuated by the central control via a computer network.

* * * * *

Disclaimer

8,468,027 B2 — Brady Dow, Riverton, UT (US). SYSTEMS AND METHODS FOR DEPLOYING AND UTILIZING A NETWORK OF CONVERSATION CONTROL SYSTEMS. Patent dated June 18, 2013. Disclaimer filed March 23, 2015, by the assignee, Kombea Corporation.

Hereby disclaims all of claims of said patent, 1-23. (Official Gazette, May 12, 2015)

*(Official Gazette, May 12, 2015)*